United States Patent
Hasegawa et al.

(10) Patent No.: US 6,590,741 B1
(45) Date of Patent: Jul. 8, 2003

(54) MAGNETIC HEAD HAVING GROOVES TO ENHANCE CONTACT WITH MAGNETIC RECORDING MEDIA AND MAGNETIC RECORDING/REPRODUCING APPARATUS

(75) Inventors: Kenji Hasegawa, Hirakata (JP); Hiroyuki Hasegawa, Kyotanabe (JP); Eisuke Sawai, Kyotanabe (JP); Ken Takahashi, Osaka (JP); Hiromi Takeda, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/593,057

(22) Filed: Jun. 13, 2000

(30) Foreign Application Priority Data

Jun. 14, 1999 (JP) ............................. 11-166572
Oct. 14, 1999 (JP) ............................. 11-292957

(51) Int. Cl.[7] .......................... G11B 5/187; G11B 15/60
(52) U.S. Cl. .................................. 360/122; 360/130.24
(58) Field of Search .......................... 360/122, 130.24

(56) References Cited

U.S. PATENT DOCUMENTS

| | | | | |
|---|---|---|---|---|
| 3,872,507 A | * | 3/1975 | Sano ........................... | 360/102 |
| 5,243,483 A | | 9/1993 | Ono et al. | |
| 5,289,330 A | * | 2/1994 | Wade ........................ | 360/122 |
| 5,475,552 A | | 12/1995 | Nasu et al. | |
| 5,488,527 A | * | 1/1996 | Komori ..................... | 360/122 |
| 5,636,092 A | | 6/1997 | Nasu et al. | |
| 5,864,451 A | | 1/1999 | Sato | |

FOREIGN PATENT DOCUMENTS

| JP | 01307905 A | 12/1989 |
|---|---|---|
| JP | 05128427 A | 5/1993 |
| JP | 05250621 A | 9/1993 |
| JP | 06004812 A | 1/1994 |
| JP | 06119613 A | 4/1994 |
| JP | 06195619 A | 7/1994 |
| JP | 7-93723 | 4/1995 |
| JP | 07129916 A | 5/1995 |
| JP | 7-153035 | 6/1995 |
| JP | 07192361 A | 7/1995 |
| JP | 08030913 A | 2/1996 |
| JP | 08030914 A | 2/1996 |
| JP | 08036709 A | 2/1996 |
| JP | 08147620 A | 6/1996 |
| JP | 10162332 A | 6/1998 |
| JP | 11185221 A | 7/1999 |

* cited by examiner

Primary Examiner—A. J. Heinz
(74) Attorney, Agent, or Firm—Akin, Gump, Strauss, Hauer & Feld, L.L.P.

(57) ABSTRACT

A magnetic head for attachment to a drum includes two magnetic cores butted against each other, and a gap is formed therebetween. A glass is bonded to the upper butted portion. A winding is provided on the magnetic cores, and electromagnetic transformation is carried out. On the sliding face of the magnetic head, two grooves and are formed with the gap positioned therebetween at positions symmetrical with each other in a rotation direction of the drum to provide good contact between the magnetic head and a magnetic tape or other magnetic medium. A protective film is formed on the surface of the sliding face. The magnetic head generates a negative pressure by virtue of the grooves formed in the sliding face in the rotation direction of the drum, thereby improving contact between the magnetic head and the magnetic tape.

11 Claims, 27 Drawing Sheets

(a)

(b)

(c)

(a)

(b)

(c)

(a)

(b)

(c)

(a)

(b)

(a)

(b)

Magnified view of A (with glass removed)

(a)

(b)

MAGNETIC HEAD HAVING GROOVES TO ENHANCE CONTACT WITH MAGNETIC RECORDING MEDIA AND MAGNETIC RECORDING/REPRODUCING APPARATUS

BACKGROUND OF THE INVENTION

1. Field of the Invention

The present invention relates to a magnetic head for use in a magnetic recording/reproducing apparatus having a rotation drum and to a magnetic recording/reproducing apparatus having the magnetic head.

2. Description of Related Art

A magnetic head mounted on a rotation drum and used in a conventional technology is used in a magnetic recording/reproducing apparatus on the precondition that the head wears constantly as a magnetic tape travels. Usually, before the magnetic head is mounted on the rotation drum, its sliding face is ground by a lapping tape so as to have a shape having curvatures in the longitudinal direction (i.e., the mutual travel direction of the head and tape) and in the width direction (the direction perpendicular to the above-mentioned longitudinal direction on the sliding face) respectively.

Furthermore, a lapping magnetic tape having a large grinding capability is traveled over the magnetic head mounted on the rotation drum to obtain excellent contact with a magnetic tape. by this travel, the magnetic head is worn slightly, and the shape of its sliding face is fitted for tape travel.

In addition, since the magnetic head wears away as a magnetic tape travels for a long period and its projection amount decreases (the amount of wear is 10 $\mu$m at the gap of the magnetic head after tape travel of 1000 hours for example), the initial projection amount has been decided to have a value in consideration of the amount of wear so that sufficient head touch can be attained even if the magnetic head wears away.

The dimensions of the sliding face of the magnetic head for a VHS-format VTR are, for example, 100 $\mu$m in core width and 2 mm in length in the longitudinal direction.

As another conventional example, a magnetic head based on a reproduction principle different from that of an inductive magnetic head has been developed and put to practical use. This magnetic head is a magnetic head using a magnet-resistive effect element for reproduction (hereinafter referred to as an MR head").

The reproduction output of the MR head is not dependent on the relative speed between the MR head and a magnetic recording medium, but is proportional to a sense current to be applied.

Recently, by utilizing this feature, the MR head has been used for digital-audio magnetic recording apparatuses, etc., wherein the relative speed between the head and the magnetic recording medium is extremely low and for magnetic recording apparatuses, such as hard disk drives, wherein recording density is extremely high and sufficient output is thus not obtained by the inductive magnetic head.

Because of the reasons mentioned below, the MR head is designed to have a minute dimension in height (hereinafter referred to as a head height) in a direction perpendicular to its face sliding over a magnetic tape. In other words, it is known that the intensity of the magnetic field from the magnetic recording medium decreases exponentially in the direction of the head height.

Therefore, in the case when the MR head is disposed over the magnetic recording medium, an inflow magnetic flux attenuates greatly at about several micrometers in the direction of the head height in the MR head. In a region into which the magnetic flux flows, the magnetization direction of the MR head is rotated by the inflow magnetic flux, and the resistance value of the MR head changes.

When a current is flown to the MR head, a voltage corresponding to the change in the resistance value generates across both ends of the MR head, and the voltage is taken out as a reproduced signal voltage for the information recorded on the medium.

In order to extend the lives of these magnetic heads, it is proposed that a protective film is formed on the sliding faces of the magnetic heads (Japanese Laid-open Patent Application No. Hei 6-119613). It is believed that if wear is suppressed by the attained

BRIEF SUMMARY OF THE INVENTION

However, in the case when the shape of the magnetic head is fitted so as to have a desired shape by making the magnetic head wear away by traveling thereon a magnetic tape having a high grinding capability, the magnetic head wears away by 1 to 2 $\mu$m for example. Therefore, the initial head projection amount and depth of the magnetic head must be determined in consideration of the amount of wear.

In addition, in the case of a small magnetic head inherently having a small initial depth, its life becomes short. Demands for solving these problems are thus present.

As described above, recently, an attempt to raise the recording density of a magnetic tape apparatus by using an MR head has begun. However, in adopting the MR head for a rotation-drum-type magnetic tape apparatus, such as a VTR, it is necessary to improve the low wear resistance of the MR head.

In the rotation-drum-type magnetic tape apparatus, the sliding area between the magnetic head and the magnetic tape is small. Therefore, the pressure applied to the magnetic head per unit area is high. In addition, since the magnetic head and the magnetic tape slide with each other at a high relative speed of more than 10 n/sec, the condition with respect to wear is severe.

Since the MR head is small in head height, it wears out in a short time, and its output is not delivered. In addition, the cross-sectional area of the MR head itself decreases with the progress of wear, and the resistance value of the MR head increases; and therefore, the MR head is broken by Joule's heat generated by a sense current supplied to detect a signal.

Furthermore, since the relationship between the intensity of the magnetic field of the MR head and the change in the resistance is nonlinear, the signal distortion due to this nonlinear characteristic is affected complicatedly by the wear. As described above, since the MR head is greatly affected by the wear, it is desirable that head touch in the initial shape of the head should be good.

Moreover, in the case when a protective film is formed on the sliding face of the magnetic head, since the shape of the sliding face cannot be fitted after the head is mounted on the rotation drum, it is difficult to obtain good contact with the magnetic tape. On the other hand, there was a problem that in case the core width at the sliding face is increased or the projection amount of the head is decreased in order to reduce the wear of the protective film, the head touch becomes worse.

An object of the present invention is to provide a magnetic head capable of obtaining good contact with a magnetic tape and being less likely to wear away and to provide a magnetic recording/reproducing apparatus using the magnetic head.

The present invention is characterized by a magnetic head mounted on a rotation drum to perform magnetic recording or reproduction by making contact with and sliding over a magnetic tape wherein two grooves substantially in the rotation direction of the drum are formed with a predetermined distance therebetween in the sliding face of the above-mentioned magnetic head making contact with the magnetic tape, and a gap is provided in the sliding face positioned between the above-mentioned two grooves.

The invention in accordance with another point of view is characterized in that constitution of the above-mentioned invention further comprises a rotation drum device having a rotation drum provided with the magnetic heads and a stationary drum adjacent to the above-mentioned rotation drum, rotation posts and slant posts for guiding the magnetic tape to the above-mentioned rotation drum device and contacting the above-mentioned magnetic tape with the external faces of the above-mentioned stationary drum and the above-mentioned rotation drum, and a capstan and a pinch roller for feeding the above-mentioned magnetic tape at a predetermined speed.

The invention in accordance with still another point of view is characterized by a magnetic head mounted on a rotation drum to perform magnetic recording or reproduction by making contact with and sliding over a magnetic tape, wherein two grooves substantially in the direction of rotation axis are formed with a predetermined distance therebetween and a gap provided therebetween of the drum in the sliding face of the above-mentioned magnetic head making contact with the magnetic tape, and the positions of the above-mentioned grooves are within the range of the sliding portion in which the magnetic head makes contact-with the tape.

The invention in accordance with yet still another point of view is the above-mentioned invention further comprising a rotation drum device having a rotation drum provided with the magnetic heads and a stationary drum adjacent to the above-mentioned rotation drum, rotation posts and slant posts for guiding the magnetic tape to the rotation drum device and contacting the above-mentioned magnetic tape with the external faces of the above-mentioned stationary drum and the above-mentioned rotation drum, and a capstan and a pinch roller for feeding the above-mentioned magnetic tape at a predetermined speed.

The invention in accordance with still other point of view is characterized by a magnetic head provided with a magnet-resistive effect element, wherein a dent portion is formed around the magnet-resistive effect element in the sliding face making contact with a magnetic recording medium.

DETAILED DESCRIPTION OF THE INVENTION

The present invention will be described below in detail by explaining preferred embodiments in accordance with the present invention referring to the accompanying drawings.
((Embodiment 1))

Figure 1:
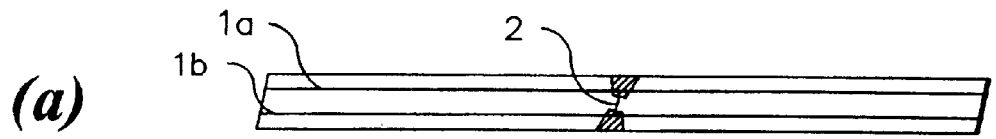
FIG. 1(a) is a front external view showing a magnetic head in accordance with embodiment 1 of the present invention.
FIG. 1(b) is a side elevational view of the magnetic head of FIG. 1(a)
FIG. 1(c) is a magnified top plan view of a sliding face of the magnetic head of FIG. 1(a)
Figure 1:
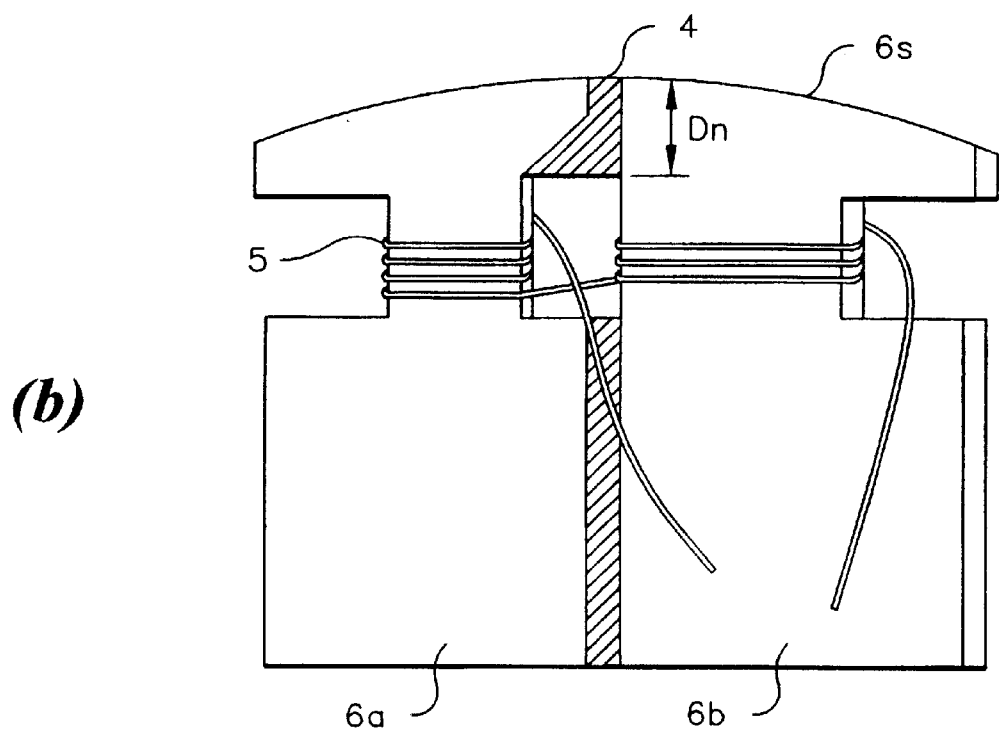
Figure 1:
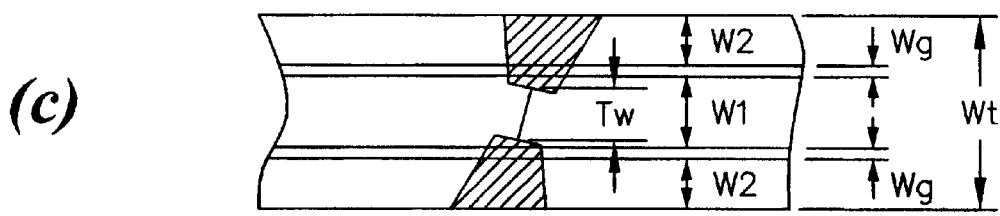

A magnetic head in accordance with embodiment 1 of the present invention will be described referring to the drawings. FIG. 1 is an external view showing the magnetic head in accordance with the embodiment 1; (a) is a front view, (b) is a side view, and (c) is a magnified view of its sliding face 6s. As shown in FIG. 1 (b), the magnetic head comprises a left magnetic core 6a and a right magnetic core 6b, which are made of ferrite for example and butted against each other, and a gap 2 is formed therebetween.

A glass member 4 for bonding is bonded to the upper butted portion. A winding 5 is provided on the magnetic cores 6a and 6b in series, and electromagnetic transformation is carried out. The distance from the apex of the sliding face 6s to the notch processed portion 600 of the winding portion is designated by Dn.

On the sliding face 6s of the magnetic head, in the rotation direction of the drum (hereinafter referred to as the longitudinal direction), two grooves 1a and 1b are formed with the gap 2 positioned therebetween at positions symmetrical with respect to the center point of the gap in the longitudinal direction and in the width direction perpendicular thereto.

As shown magnified in FIG. 1(c), the track width of the gap is designated by Tw, the width of each groove is designated by Wg, the width of the sliding face including the gap portion between the two grooves is designated by W1, the width of the sliding face 6s from the groove to the end of the magnetic core is designated by W2, and the depth of the groove measured from the sliding face at the apex of the head is designated by Dg.

For example, the width Wg of each groove is 20 $\mu$m, Dg is 100 $\mu$m, W1 is 60 $\mu$m, and W2 5 is 100 $\mu$m. The total core width Wt of the sliding face 6s is 300 $\mu$m.

In order to find the optimal range of W1, in the case when the total core width of the sliding face was fixed at 300 $\mu$m, Wg was fixed at 20 $\mu$m and Tw was fixed at 10 $\mu$m, and when the width W1 was changed from 10 $\mu$m to 200 $\mu$m, a change in output was obtained.

Figure 2:
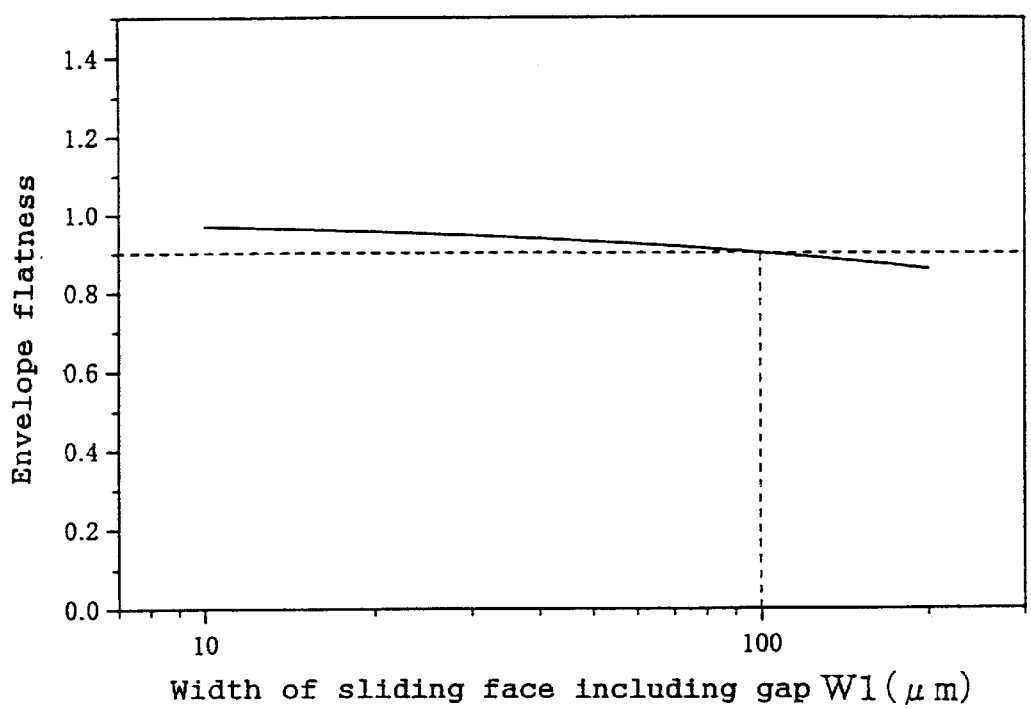
FIG. 2 is a view showing the relationship between the width of the sliding face and the envelope flatness in accordance with the embodiment 1 of the present invention.

By using the maximum value and the minimum value of the output obtained from the envelope of the output, a value was obtained by dividing the minimum value by the maximum value and defined as envelope flatness. The relationship between the width W1 of the sliding face including the gap portion and the envelope flatness was shown in FIG. 2.

If the envelope flatness value of up to 0.9 is acceptable, the value of the width W1 of the sliding face should be 100 $\mu$m or less. In an actual head, the track width Tw differs depending on the head; and therefore, the width W1 of the sliding face should be in the range of the value of two or more to 100 $\mu$m or less in order not to adversely affect recording and reproduction.

In addition, in this embodiment, the length of the sliding face is 2 mm for example.

Preferable examples of the radii of curvature of the sliding face of the magnetic head in the side view are 2 mm in the direction of the core width and 6 mm in the rotation direction of the drum for example. Since the grooves are processed by a dicing saw or the like for example, they are generally formed in parallel with the bottom face of the magnetic core.

Figure 3:
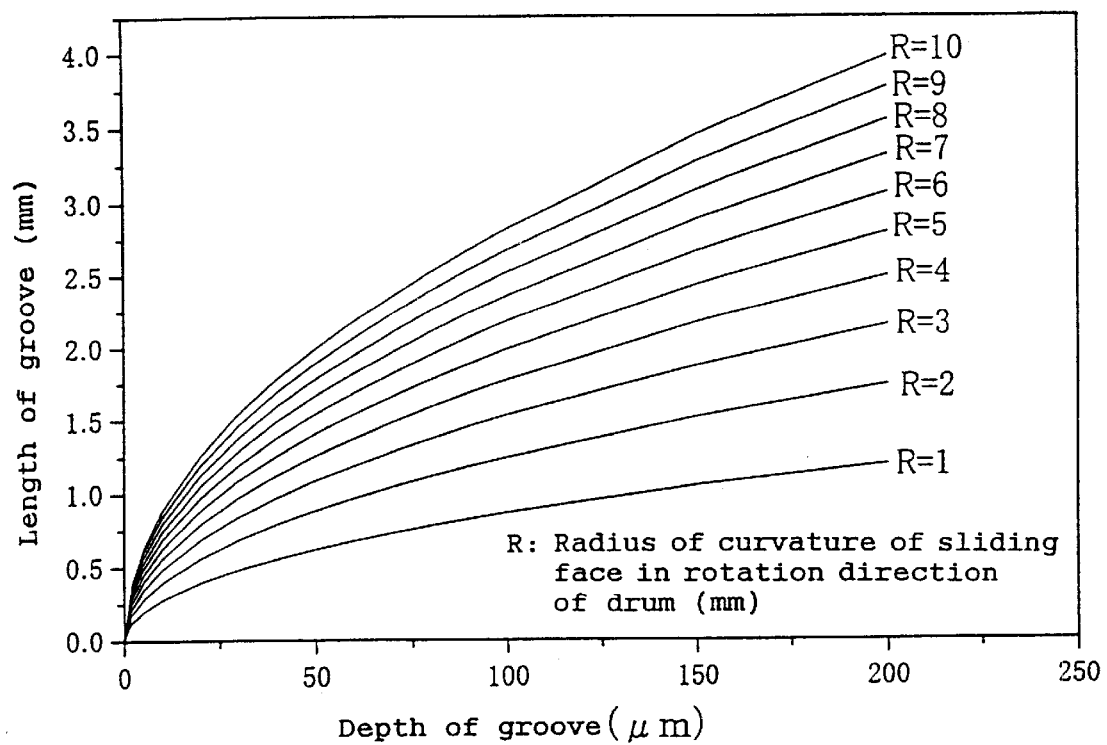
FIG. 3 is a view showing the relationship between the width of the groove and the depth of the groove in accordance with the embodiment 1 of the present invention.

Therefore, the depth from the bottom of the groove to the sliding face is not constant; and the depth is large at the apex portion, and the depths at both ends in the rotation direction of the drum are small. The relationship between the depth of the groove and the length of the groove at the apex portion of the head is shown in FIG. 3 in the case when the radius of curvature R of the sliding face in the rotation direction of the drum is fixed.

The respective curves were obtained when the value of the radius R was used as a parameter. The length of the sliding face is generally 0.5 to 3 mm, and the radius of curvature of the sliding face in the rotation direction of the drum is generally 1 to 10 mm.

When the magnetic head is viewed in the direction of the groove depth, the magnetic core has some portions wherein the length thereof is short because of notch-processing or the like at the winding portion; and therefore, if the value of Dg is too large, the strength of the magnetic head lowers, and its electromagnetic transformation characteristic is likely to be affected.

In an ordinary magnetic head, the distance Dn from the apex of the sliding face to the upper end of the notch-processed portion (window) of the winding portion is 100 to 200 $\mu$m. The value of Dg is decided in consideration of the radii of curvature and the lengths of the grooves of the magnetic head.

Figure 4:
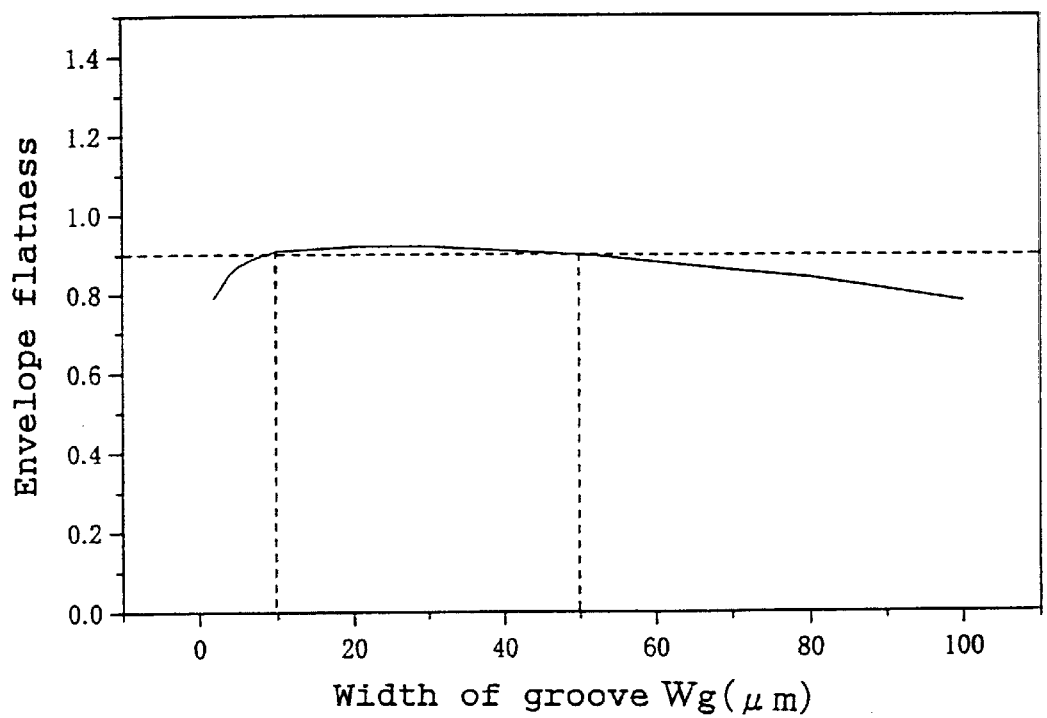
FIG. 4 is a view showing the relationship between the width of the groove and the envelope flatness in accordance with the embodiment 1 of the present invention.

In order to find the optimal range of the width Wg of the groove, in the case when the core width Wt of the entire sliding face was fixed at 300 μm and Tw was fixed at 10 μm and the width W1 was fixed at 60 μm, and when the value of the groove width Wg was changed from 2 μm to 100 μm, a change in output was obtained. The relationship between the groove width Wg and the output envelope flatness (relative value) is shown in FIG. 4.

If an envelope flatness value of more than 0.9 is acceptable, the acceptable range of the value of Wg is in the range of 10 μm or more to 50 μm or less.

In the magnetic head of the present invention, when the magnetic head is mounted on a rotation drum, a negative pressure generates at the central portion of the sliding face by virtue of the grooves 1a and 1b formed in the sliding face. This negative pressure improves the contact condition between the tape and the magnetic head. By forming these grooves 1a and 1b, it is not necessary to carry out tape fitting in an initial period.

((Embodiment 2))

Figure 5:
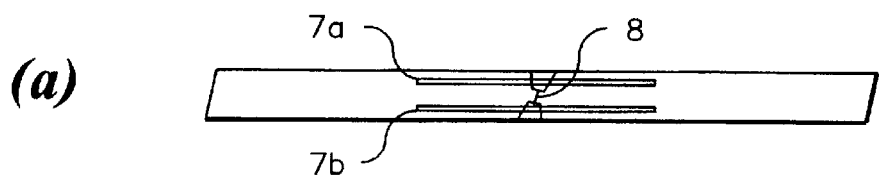
FIG. 5(a) is a front external view showing a magnetic head in accordance with embodiment 2 of the present invention.
FIG. 5(b) is a side elevational view of the magnetic head of FIG. 5(a)
FIG. 5(c) magnified top plan view of a sliding face of the magnetic head of FIG. 5(a)
Figure 5:
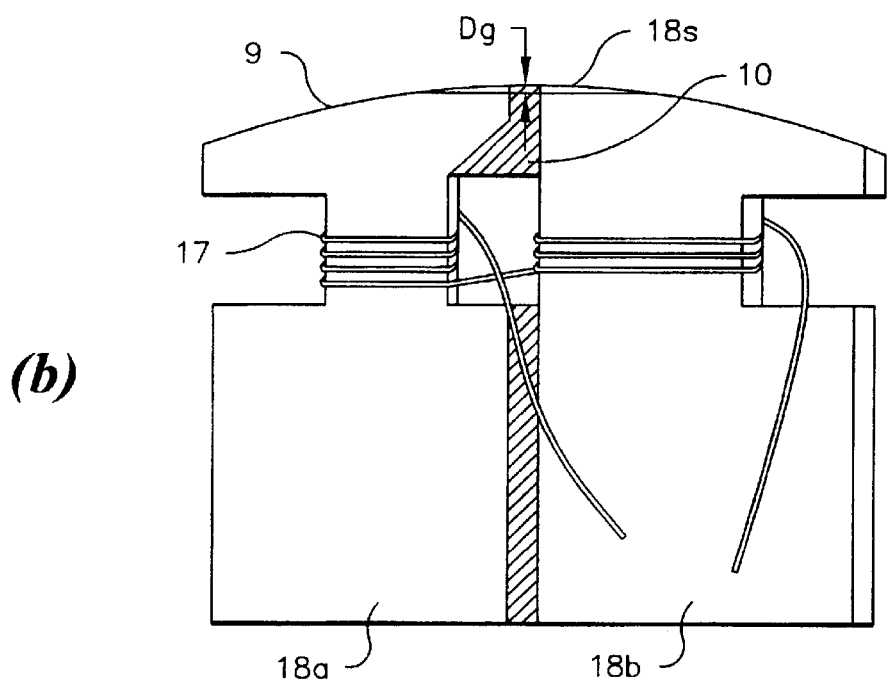
Figure 5:
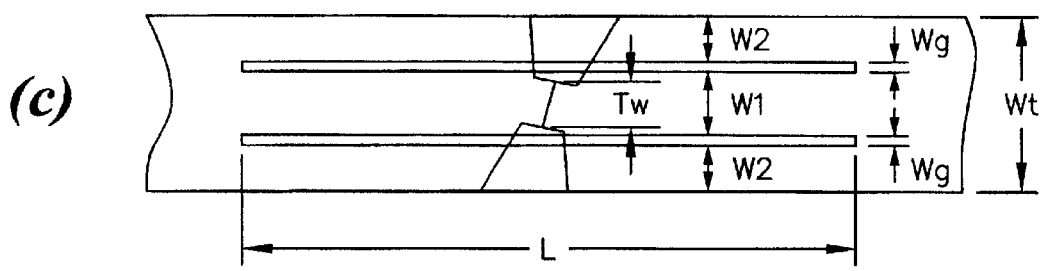

A magnetic head in accordance with embodiment 2 of the present invention will be described referring to the drawings. FIG. 5 is an external view showing the magnetic head in accordance with the embodiment 2; part (a) is a front view, part (b) is a side view, and part (c) is a magnified view of its sliding face 18s.

As shown in FIG. 5 (b), the magnetic head comprises a left magnetic core 18a and a right magnetic core 18b, which are made of ferrite for example and butted against each other, and a gap 8 is formed therebetween. A glass member 10 for bonding is bonded to the upper butted portion. A winding 17 is provided on the magnetic cores 18a and 18b in series, and electromagnetic transformation is carried out.

On the sliding face 18s of the magnetic head, in the rotation direction of the drum, two grooves 7a and 7b are formed with the gap 8 positioned therebetween at positions symmetrical with respect to the center point of the gap in the longitudinal direction and in the width direction perpendicular thereto.

On the surface of the sliding face 18s of the head, a protective film 9 consisting of diamond-like carbon and having a thickness of 50 nm for example is formed by the ECR (electron cyclotron resonance) plasma CVD method.

In the present embodiment, although the ECR plasma CVD method was taken as an example of a method of producing the diamond-like carbon, the RF plasma CVD method can also be used. In addition, other methods described below can also be used. That is, the reactive sputtering method, sputtering method, ion plating method and cathodic arc method can be used.

As shown magnified in FIG. 5 (c), the track width of the gap is designated by Tw, the width of each groove is designated by Wg, the width of the sliding face including the gap portion between the two grooves is designated by W1, the width of the sliding face 18s from the groove to the end is designated by W2, the length of the groove is designated by L, and the depth of the groove measured from the sliding face at the apex of the head is designated by Dg.

In this structure, W1 must be larger than Tw not to adversely affect recording and reproduction. The width Wg of each groove should preferably be 10 to 50 μm. In the embodiment 2, Wg is 20 μm, L is 630 μm and Dg is 10 μm for example. W1 is 70 μm and W2 is 80 μm for example. As a result, the core width of the entire sliding face is 270 μm.

The length of the sliding face 18s is 1.5 mm for example in this embodiment. The radii of curvature of the sliding face 18s of the magnetic head in the side view are 1.8 mm in the direction of the core width and 5 mm in the rotation direction of the drum for example.

When the magnetic head is seen in the direction of the groove depth, the magnetic core has some portions wherein the length thereof is short because of notch-processing or the like at the winding portion. Therefore, if the value of Dg is too large, the strength of the magnetic head lowers, and its electromagnetic transformation characteristic may be affected.

In an ordinary magnetic head, the distance from the apex of the sliding face to the notch-processed portion of the winding portion is 100 to 200 μm. The value of Dg is determined in consideration of the radii of curvature and the lengths of the grooves of the magnetic head. The value of Wg should be 10 μm to 50 μm as described in the embodiment 1.

When the magnetic head of the embodiment 2 was mounted on a VTR and a tape is transmitted, the length of the sliding face 18s wherein the magnetic head makes contact with the tape is 800 μm; the grooves 7a and 7b are shorter than the sliding face in length and are positioned at the sliding portion. In this condition, a negative pressures are generated at the grooves 7a and 7b in the sliding face 18s, and the tape is attracted; and therefore, the contact condition between the head and the tape is improved.

In the magnetic head of the present embodiment, the negative pressure is generated only at the contact portion. Therefore, the sliding face portions outside the grooves are not affected by the grooves, thereby slightly deformed; and as a result, even when a thin tape having an entire thickness of 10 μm or less travels for example, it can be avoided from being damaged.

The magnetic head of the present embodiment 2 and the magnetic heads of comparison examples 1 to 3 having the core widths at the sliding faces shown in TABLE I below and having no groove were each mounted on the same VHS-format VTR, and experiments were conducted with respect to the output and the wear characteristics of the magnetic heads.

As a protective film, a film of the known diamond-like carbon having a thickness of 30 nm was formed on the sliding faces of all the magnetic heads of the embodiment and the comparison examples.

In addition, the sliding faces of all the heads were the same in length and radius of curvature. The wear characteristic was judged to be 0 (good) in the case when the amount of wear was 3 μm or less at the time when the tape traveled for 1000 hours, and judged to be X (bad) in the case when the amount of wear was more than 3 μm. The output was judged to be 0 (good) in the case when the envelope flatness value was 0. 9 or more, and judged to be X (bad) in the case when it was less than that value.

TABLE 1 shows the evaluation results of the core width Wt, projection amount, output and wear characteristic of the sliding face. In the present embodiment, both the output and the wear characteristic were good; and in the comparison example 1, the output was good but the amount of wear was large, and in the comparison example 2, both the output and the wear characteristic were bad. In the comparison example 3, the wear characteristic was good, but the output was bad.

It is conceived that the output was bad in the comparison examples 2 and 3 because the head touch (the contact condition between the tape and the magnetic head) at the gap portion was bad owing to the large core width, that is, because spacing was made. In the case of the magnetic head of the present embodiment, head touch was good thanks to the effect of the grooves formed although the core width Wt was wide and the amount of projection was small, and the wear characteristic was also good (the amount of wear was small).

TABLE 1

| Magnetic head | Core width at sliding face (µm) | Amount of projection (µm) | Output | Wear |
|---|---|---|---|---|
| Embodiment 1 | 300 | 25 | ○ | ○ |
| Comparison example 1 | 100 | 45 | ○ | x |
| Comparison example 2 | 300 | 45 | x | x |
| Comparison example 3 | 300 | 25 | x | ○ |

In the magnetic head of the present invention, when the magnetic head is mounted on a rotation drum, a negative pressure is generated by virtue of the grooves 7a and 7b formed in the sliding face 18s; and therefore, the contact condition between the tape and the magnetic head is improved. By forming these grooves 7a and 7b, it is not necessary to carry out tape fitting in an initial period of the use of the head.

Furthermore, in the case of a magnetic head with no protective film, the head wears away as the tape travels, and the lengths of the grooves change, thereby diminishing the effect of attracting the tape early; on the other hand, in the case of the magnetic head of the embodiment 2, its protective film suppresses wear; therefore, even when the tape traveled for a considerably long time (1000 hours in the examples in the above-mentioned table), the lengths of the grooves change scarcely, thereby enabling realization of stable head touch.

((Embodiment 3))

Figure 6:
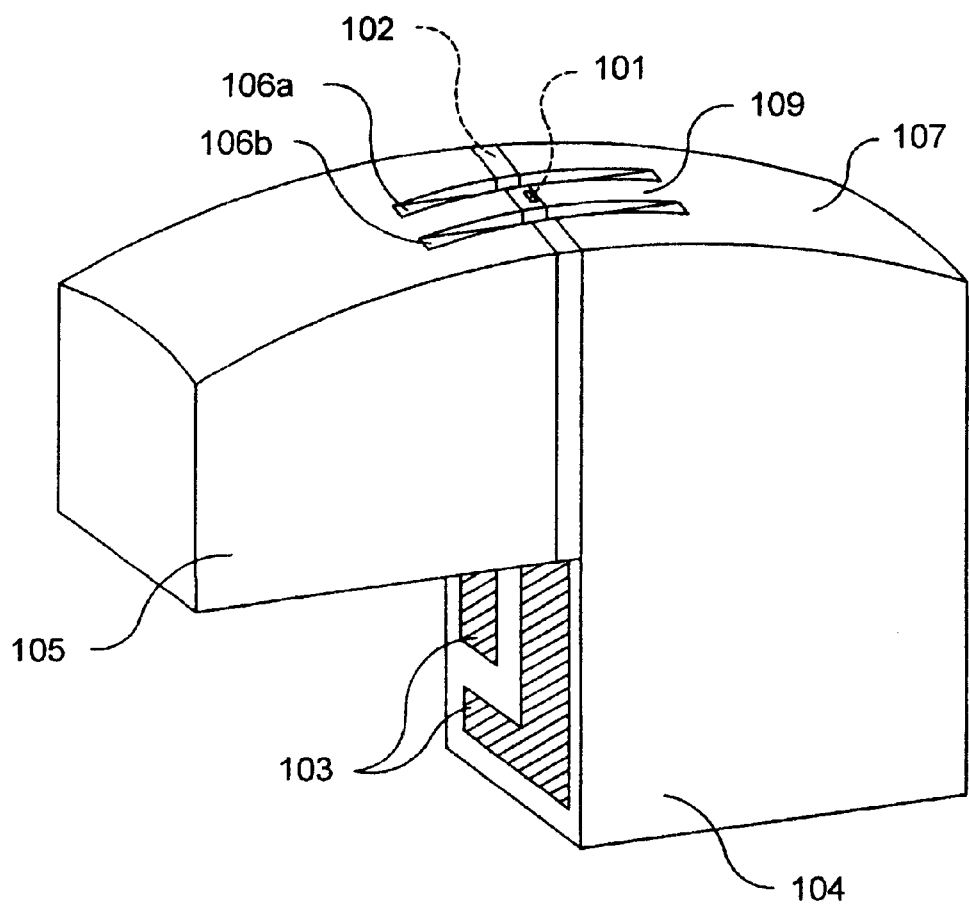
FIG. 6 is perspective view showing the magnetic head in accordance with embodiment 3 of the present invention.
Figure 7:
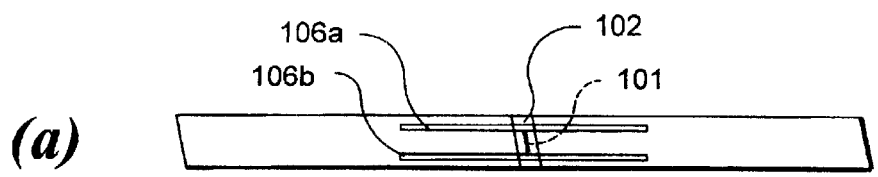
FIG. 7(a) is a front external view showing a magnetic head in accordance with the embodiment 3 of the present invention.
FIG. 7(b) is a side elevational view of the magnetic head of FIG. 7(a)
FIG. 7(c) is a magnified top plan view of a sliding face of the magnetic head of FIG. 7(a)
Figure 7:
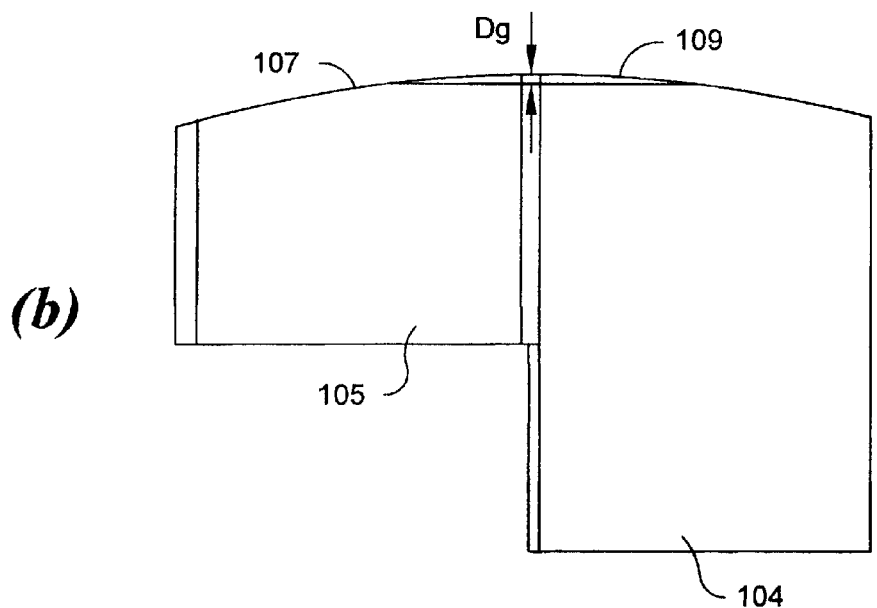
Figure 7:
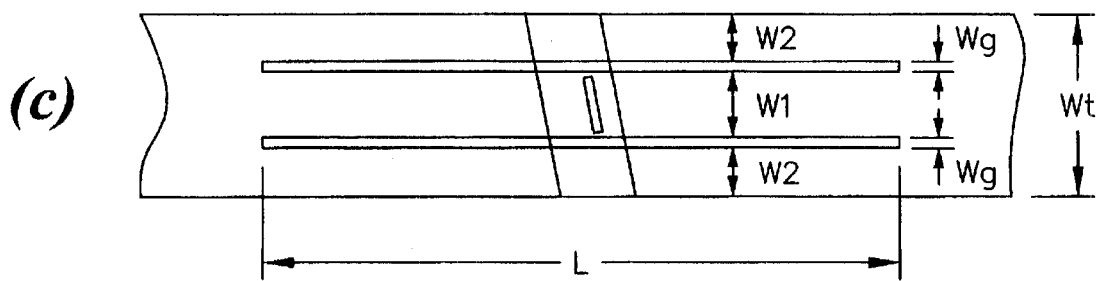

A magnetic head in accordance with embodiment 3 of the present invention will be described referring to FIGS. 6 and 7. FIG. 6 is a perspective view showing the basic structure of the magnetic head of the present embodiment. FIG. 7 is an external view showing the magnetic head in accordance with the embodiment 3; therein part (a) is a front view, part (b) is a side view, and part (c) is a magnified view of its sliding face 109.

In the present embodiment, a thin-film magnetic head used as a magnetic head will be described. In FIG. 6, the thin-film magnetic head is provided with an MR element 101 made of a magnetic material having the anisotropic magnet-resistive effect, such as NiFe or FeCo, or a magnetic material having the giant magnet-resistive effect and formed into a predetermined pattern on a substrate 104 of NiZn ferrite having excellent wear resistance as described below.

As a preferred example of a shielded MR element, it is possible to use a head based on the technologies disclosed in Japanese Laid-open Patent Application No. Hei 7-93723 and Japanese Laid-open Patent Application No. Hei 7-153035 of the same assignee and wholly incorporated in the present application by referring to their numbers in the present application.

This MR element 101 has the structure of the shielded MR head, and two grooves 106a and 106b are formed in the sliding face 109 of the magnetic head in the rotation direction of the drum and in the longitudinal direction at positions substantially symmetrical with each other with the MR element 101 disposed therebetween.

In addition, on the surface of the sliding face of the head, a protective film 107 consisting of diamond-like carbon and having a thickness of 50 nm for example is formed by the ECR plasma CVD method for example.

In the present embodiment, although the ECR plasma CVD method was taken as an example of a method of producing the diamond-like carbon, the RF plasma CVD method can also be used. In addition, other methods described below can also be used. That is, the reactive sputtering method, sputtering method, ion plating method and cathodic arc method can be used.

As shown magnified in FIG. 7 (c), the width of the groove is designated by Wg, the width of the sliding face 109 including the gap portion between the two grooves is designated by W1, the depth of the sliding face 109 from the groove to the end is designated by W2, the length of the groove is L, and the depth of the groove at the apex of the head is designated by Dg (FIG. 7(b)).

In this structure, the width W1 of the sliding face 109 must be larger than the length of the MR element on the sliding face 109 not to adversely affect electromagnetic transformation. Wg should preferably be 10 to 50 µm. In this embodiment, the width of the groove Wg is 20 µm, L is 560 µm and the width of the groove Dg is 10 µm for example.

In a preferred embodiment, W1 is 70 µm and W2 is 80 µm for example; as a result, the core width at the entire sliding face is 270 µm. At this time, the length of the sliding face was 1.5 mm for example, the radius of curvature of the magnetic head was 2 mm in the direction of the core width Wt and 4 mm in the rotation direction of the drum for example.

For example, the technologies described and disclosed in the Japanese Laid-open Patent Application No. Hei 7-153035 and No. Hei 7-93723 applied by the same applicant can be used for the head having the MR element 101. By individually referring to the contents of these technologies, the technologies are included in the descriptions of the present specification.

As the type of MR head, in addition to the above-mentioned shielded MR head, it is possible to use various types, such as an unshielded MR head, a dual stripe MR head, a vertical MR head, a flux guide MR head, etc.

The MR head is produced by forming a thin film having the magnet-resistive effect by the sputtering method, such as high frequency sputtering method, and by vapor deposition method, followed by forming a predetermined pattern by the photolithography method and the ion milling method, and the chemical etching method.

This MR head is held between a pair of substrates 104 and 105 via a supporting protective layer 102 which supports and protects the MR element 101 disposed at least on one side thereof. As a material which can be used for the protective layer 102, low-melting glass, such as borosilicate glass or lead glass, or an oxide, such as $Al_2O_3$ or $SiO_2$, or a nitride, such as $i_3N_4$ or TaN, is used preferably.

Furthermore, as a material of the substrates 104 and 105, in addition to the above-mentioned NiZn ferrite, it is possible to use materials having excellent wear resistance, that is, magnetic ferrite, such as MnZn ferrite, or nonmagnetic ferrite, such as Zn ferrite, or ceramics, such as $Al_2O_3$—TiC, a—hematite, NiO—$TiO_2$—MgO, $TiO_2$—CaO and NiO—MnO.

Furthermore, as shown in FIG. 6, height of the substrate 105 is made lower than height of the other substrate 104, whereby the terminal portion 103 disposed below the MR element 101 is exposed. This terminal portion 103 is connected to an external circuit not shown.

When the magnetic head of the embodiment 3 was installed and mounted on a VTR and a tape is transmitted, the sliding length along which the magnetic head makes contact with the tape is 700 µm; the grooves are shorter than the sliding portion in length and are positioned at the sliding portion. By the action in this condition, a negative pressure generates at the grooves in the sliding face 109 and the tape is attracted; and therefore, the contact condition between the head and the tape is improved.

In addition, the core width at the sliding face 109 is larger than that of a conventional magnetic head. Therefore, the pressure at the contact face becomes low, and the face becomes hard to wear away. In the magnetic head of the present embodiment, since the negative pressure generates only at the contact portion, the sliding face 109 portions outside the grooves are not affected by the grooves; and thereby slightly deformed.

As a result, even when a thin tape having an entire thickness of 10 μm or less travels for example, its damage can be avoided.

Furthermore, in comparison with the above-mentioned embodiment 3, a magnetic head having the same shape as that of the magnetic head of the present embodiment but having no protective film was mounted on the same VTR and a tape was traveled. In the comparison example, the magnetic head was worn away, the height of the MR element changed, and the output waveform was distorted as the travel time of the tape increased and exceeded 500 hours. In the case of the magnetic head of the present embodiment, it was found that wear hardly occurred and the output waveform was not distorted even after a travel period of 1000 hours or more.

In the magnetic head of the present embodiment 3, since a negative pressure generates by virtue of the grooves formed in the sliding face, the tape is attracted by the negative pressure. In this way, stable head touch can be attained, and the protective film suppresses wear; and therefore, stable electromagnetic transformation can be carried out for a long period.

((Embodiment 4))

Figure 8:
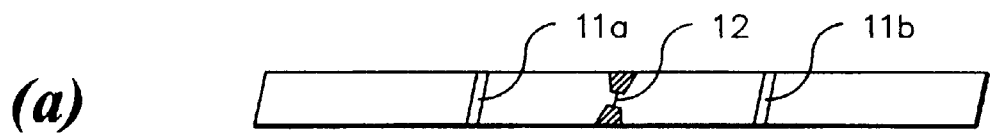
FIG. 8(a) is a front external view showing the magnetic head in accordance with embodiment 4 of the present invention.
FIG. 8(b) is a side elevational view of the magnetic head of FIG. 8(a)
Figure 8:
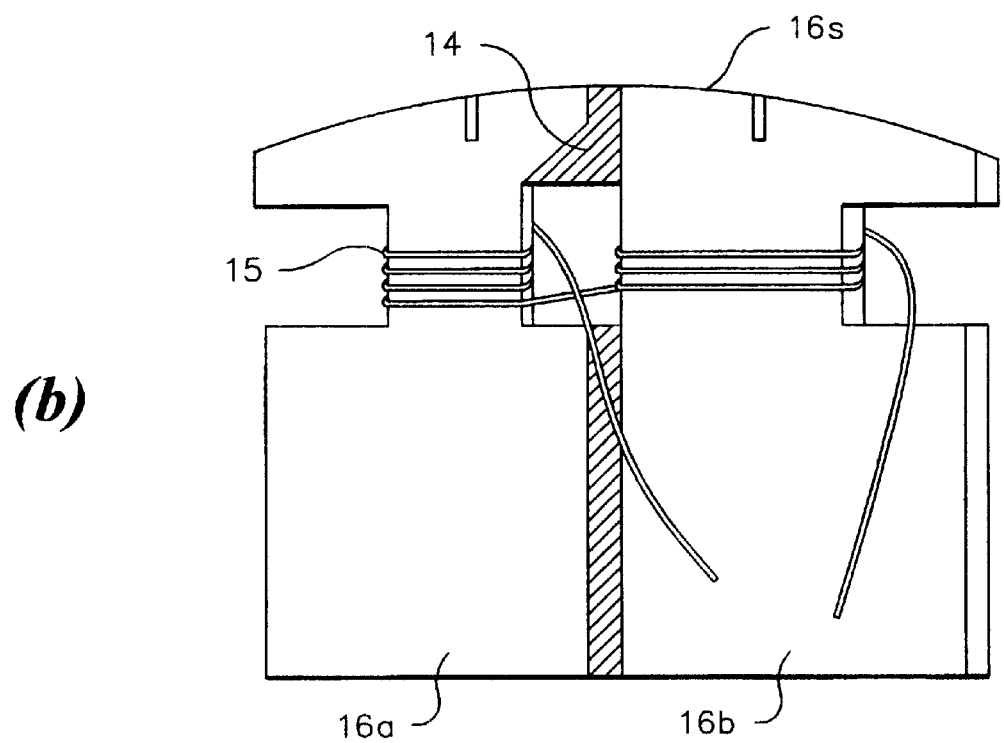

A magnetic head in accordance with embodiment 4 of the present invention will be described referring to the drawings. FIG. 8 is an external view showing the magnetic head in accordance with the embodiment 4; therein, part (a) is a front view and part (b) is a side view. As shown in FIG. 8 (b), the magnetic head comprises a left magnetic core 16a and a right magnetic core 16b, which are made of ferrite for example and butted against each other, and a gap 12 is formed. A glass member 14 for bonding is bonded to the upper butted portion. A winding 15 is provided on the magnetic cores 16a and 16b in series, and electromagnetic transformation is carried out.

On the sliding face 16s of the magnetic head, two grooves 11a and 11b are formed across the core width in a direction nearly perpendicular to the rotation direction of the rotation drum (in a direction substantially parallel with the gap 12 for example) at positions in substantially symmetry with each other with regard to the gap 12 positioned therebetween. Grooves are formed respectively, for example, at positions 250 μm away from the gap 12.

These grooves 11a and 11b are 10 to 100 μm in width and 10 to 100 μm in depth. In this embodiment, the grooves were 30 μm in width and 70 μm in depth for example. The length of the sliding face 16s was 1.5 mm and the width of the core was 200 μm. The radii of curvature of the magnetic head are 2 mm in the direction of the core width and 5 mm in the rotation direction of the drum.

A negative pressure for attracting the magnetic tape is generated by means of the grooves. Since the magnitude of the negative pressure is determined depending on the width, depth and position of the groove, they must be determined to conform to a system on which the magnetic head is mounted. If the width of the groove is more than 100 μm, the deformation of the tape at the groove increases, and the tape may be damaged due to contact; and therefore, the depth should preferably be in the range of 10 to 100 μm. Discussion is made on the depth of the groove.

The magnetic core has some portions wherein the length thereof is short because of notch-processing or the like at the winding portion; and therefore, if the depth of the groove is too large, the strength of the magnetic head lowers, and its electromagnetic transformation characteristic is likely to be affected. In an ordinary magnetic head, the distance from the apex of the sliding face 16s to the notch-processed portion of the winding portion should preferably be 15 100 to 200 μm.

Furthermore, with respect to the positions in drum revolving direction of the grooves, the grooves should desirably be positioned in the range (in drum revolving direction) of the sliding portion wherein the tape and the magnetic head make contact with each other. In the case when the grooves are formed outside the sliding portion, because of their being away from the tape, the effect of attracting the tape by the action of the grooves is diminished.

In an example of the present embodiment, in the case of the magnetic head mounted on the VTR, the sliding length for the tape and the magnetic head was 700 μm and the positions in drum revolving direction of grooves were at the sliding portion.

In the magnetic head of the present embodiment, a negative pressure is generated in the revolving direction of the drum by means of the grooves 11a and 11b formed in the sliding face 16s, and the contact condition between the head and the tape is improved. Furthermore, since a pressure is generated from the groove portion of the magnetic head in the rotation axis direction of the drum, the deformation of the tape near the magnetic head in the rotation axis direction of the drum becomes small.

Therefore, in a system wherein the deformation of the tape near the magnetic head becomes large, the contact between the head and the tape can be improved. In addition, in an apparatus having these grooves, it is not necessary to carry out tape fitting process in an initial period of use.

In order to confirm the effect of the grooves of the magnetic head, the magnetic head of the present embodiment and the magnetic head of comparison example 4 which is a magnetic head having the same shape as the present embodiment magnetic head but excluding any groove in the sliding face, were mounted on the same rotation drum. In an apparatus using the rotation drum, a magnetic tape was traveled, and the deformation of the tape was measured with an optical micrometer.

Figure 9:
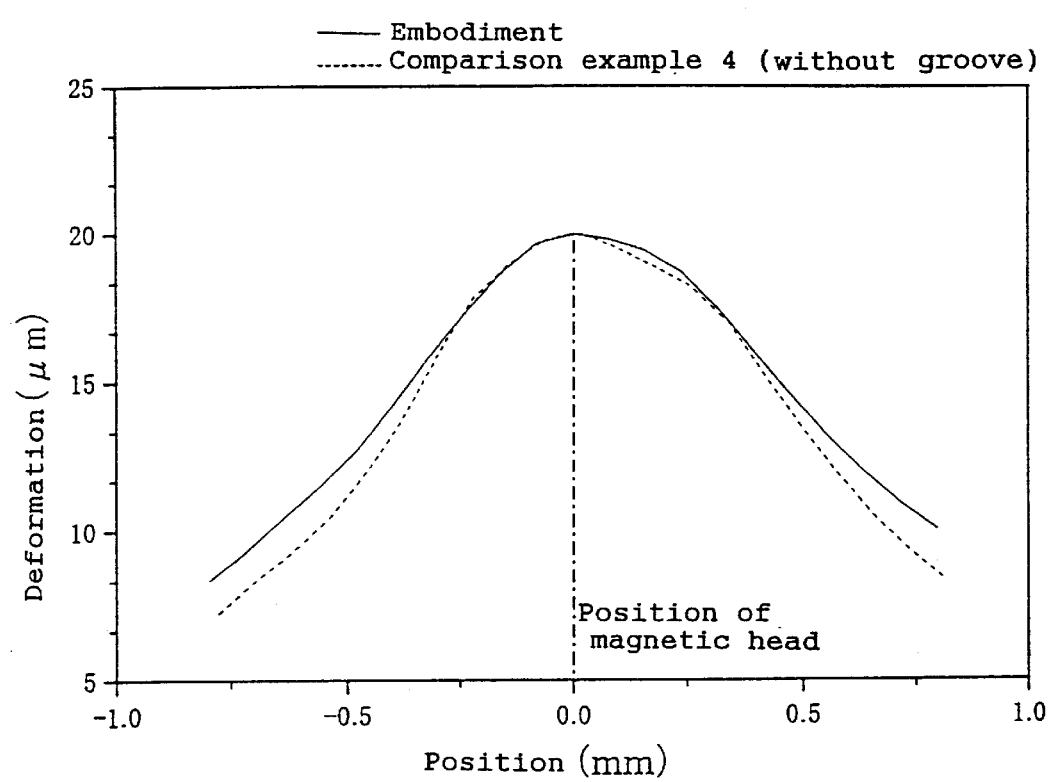
FIG. 9(a) view showing the deformation of the tape in the magnetic head in accordance with the embodiment 4 of the present invention and a comparison example.

FIG. 9 is a sectional view showing the deformation of the tape near the head in the rotation axis direction of the rotation drum. In FIG. 9, the abscissa designates the position of the tape (the +direction designates the direction of the rotation drum, and the +direction designates the direction of the stationary drum), and the ordinate designates the displacement of the tape. The solid line indicates the displacement over the magnetic head of the present embodiment, and the broken line indicates the displacement over the magnetic head of the comparison example having no grooves.

Furthermore, the vertical chain line indicates the position of the magnetic head. Referring to the figure, it is found that the contact to the magnetic head of the present embodiment is more moderate than that to the magnetic head having no grooves (the tape is not greatly deformed at the head position).

((Embodiment 5))

Figure 10:
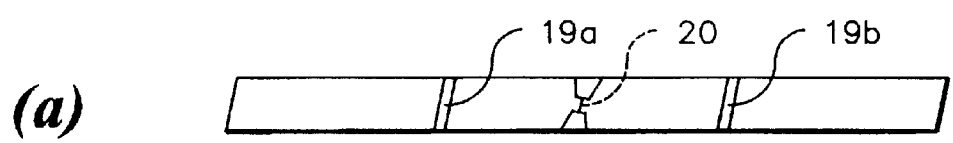
FIG. 10(a) is a front external view showing a magnetic head in accordance with embodiment 5 of the present invention.
FIG. 10(b) is a side elevational view of the magnetic head of FIG. 10(a)
Figure 10:
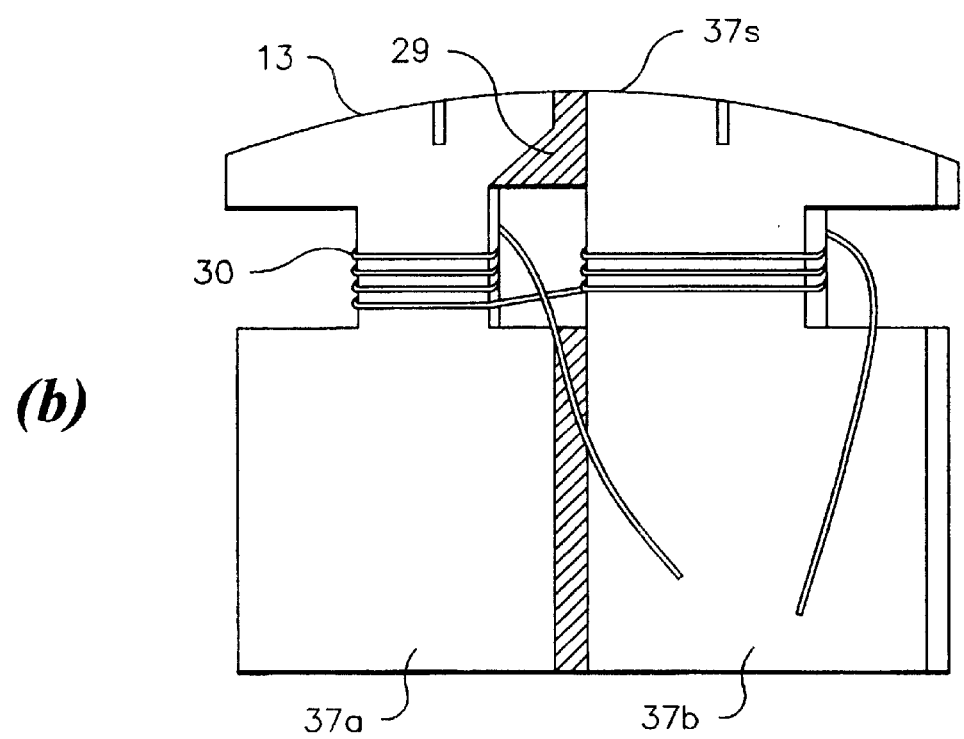

A magnetic head in accordance with embodiment 5 of the present invention will be described referring to FIG. 10. FIG. 10 is an external view showing the magnetic head in accordance with the embodiment 5; therein, part (a) is a front view and part (b) is a side view.

As shown in FIG. 10 (b), the magnetic head comprises a left magnetic core 37a and a right magnetic core 37b made of ferrite for example and butted against each other to form a gap 20. A glass member 29 for bonding is bonded to the upper butted portion. A winding 30 is provided on the magnetic cores in series, and electromagnetic transformation is carried out.

On the sliding face 37s of the magnetic head, two grooves 19a and 19b are formed across the core width in a direction nearly perpendicular to the rotation direction of the rotation drum (in a direction substantially parallel with the gap 20 example) at positions substantially symmetrical with each other with the gap 20 positioned therebetween. For example, the grooves are formed respectively at positions 150 $\mu$m away from the gap 20.

These grooves 19a and 19b were 30 $\mu$m in width and 70 $\mu$m in depth for example. The length of the sliding face 16s was 1.5 mm and the width of the core was 200 $\mu$m. The radii of curvature of the magnetic head are 2 mm in the direction of the core width and 5 mm in the rotation direction of the drum. On the surface of the sliding face 16s, a protective film 13 of cubic crystal boron nitride is formed so as to have a thickness of 30 nm for example by the ion plating method for example.

A negative pressure for attracting the magnetic tape generates by virtue of the grooves.

Since the magnitude of the negative pressure is determined depending on the width, depth and position of the groove, it must be determined to conform to a system on which the magnetic head is mounted.

If the width of the groove is more than 100 $\mu$m, the deformation of the tape at the groove portion increases, and the tape may be damaged due to contact; and therefore, the depth should preferably be in the range of 10 to 100 $\mu$m. The depth of the groove will be described below.

The magnetic core has some portions wherein the length thereof is short due to notch-processing, etc., at the winding portion; and therefore, if the depth of the groove is too large, the strength of the magnetic head lowers, and its electromagnetic transducing characteristic may be affected. In an ordinary magnetic head, the distance from the apex of the sliding face 37s to the notch-processed portion of the winding portion should preferably be 100 to 200 $\mu$m.

Furthermore, with respect to the positions of the grooves, the grooves should desirably be positioned in the range of the sliding portion wherein the tape and the magnetic head make contact with each other. In the case when the grooves are formed outside the sliding portion, since the head is away from the tape, the effect of attracting the tape by the action of the grooves is diminished.

In an example of the present embodiment, in the case of the magnetic head mounted on the VTR, the sliding length for the tape and the magnetic head was 650 $\mu$m, and the grooves were positioned at the sliding portion.

When the magnetic head of the present embodiment is mounted on a VTR, the protective film 13 can suppress wear. In addition, a negative pressure generates in the rotation direction of the drum by means of the grooves 19a and 19b formed on the sliding face 37s, and the contact condition between the head and the tape is improved. Furthermore, since a pressure generates from the groove portion of the magnetic head in the direction of the rotation axis of the drum, the deformation of the tape near the magnetic head in the rotation axis direction of the drum becomes small.

Therefore, the floating amount of the tape becomes small; and as a result, in a system wherein the deformation of the tape near the magnetic head becomes large, the contact between the head and the tape can be improved. In addition, in an apparatus having these grooves, it is not necessary to carry out tape fitting in an initial period of use.

((Embodiment 6))

Figure 11:
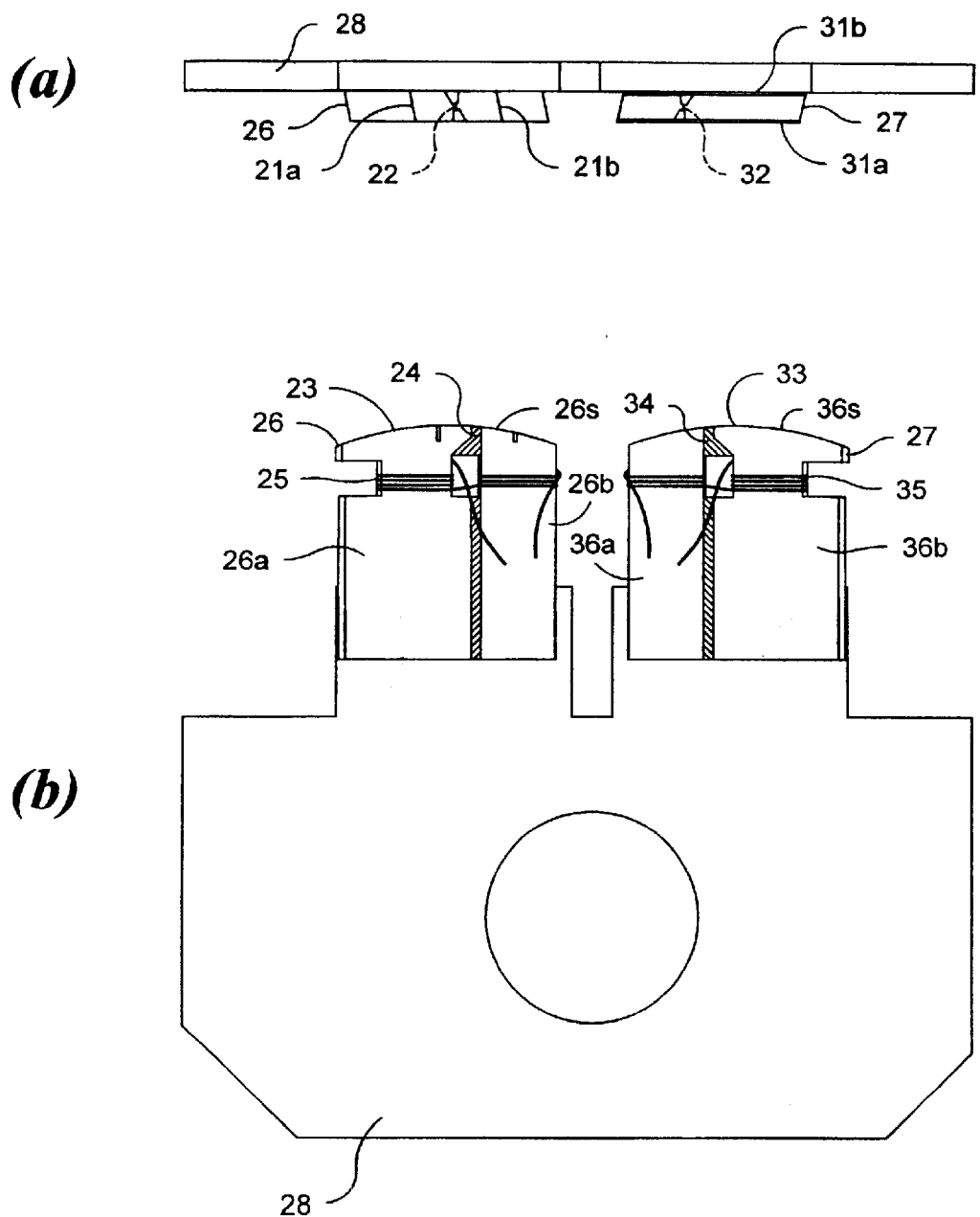
FIG. 11(a) is a front external view showing a magnetic head in accordance with embodiment 6 of the present invention.
FIG. 11(b) is a side elevational view of the magnetic head of FIG. 11(a)

A magnetic head in accordance with embodiment 6 of the present invention will be described referring to the drawings. FIG. 11 is an external view showing a multi-magnetic head in accordance with the present embodiment 6; (a) is a front view and (b) is a side view.

A first magnetic head 26 and a second magnetic head 27 are bonded to a head base 28 made of brass by using preferably an ultraviolet curing resin. Just like the magnetic head of the above-mentioned embodiment 4, the first magnetic head 26 comprises a left magnetic core 26a and a right magnetic core 26b, which are made of ferrite for example and butted against each other, thereby to form a gap 22. A glass member 24 for bonding is bonded to the upper butted portion. A winding 25 is provided on the magnetic cores, and electromagnetic transformation is carried out.

On the sliding face 26s of the first magnetic head 26, two grooves 21a and 21b are formed in a direction nearly perpendicular to the travel direction of the head, preferably in a direction parallel with the gap 22 (in the axis direction of the rotation drum) at positions substantially symmetrical with each other in travel direction of the head with the gap 22 therebetween, for example, at positions 200 $\mu$m forward and backward respectively from the gap. In a preferred embodiment, the groove is 30 $\mu$m in width, 210 $\mu$m in length and 70 $\mu$m in depth.

On the other hand, the second magnetic head 27 is similar to the magnetic head of the embodiment 1 and comprises a left magnetic core 36a and a right magnetic core 36b, which are made of ferrite for example and butted to each other, thereby to form a gap 32. A glass member 34 for bonding is bonded to the upper butted portion.

A winding 35 is provided on the magnetic cores, and electromagnetic transformation is carried out. On the sliding face 36s of the second magnetic head 36, in parallel with the rotation direction of the drum, two grooves 31a and 31b are formed in parallel with the rotation direction of the drum at positions symmetrical with each other with the gap 32 positioned therebetween.

The groove is 30 $\mu$m in width, 1000 $\mu$m in length and 70 $\mu$m in depth for example. At the time of mounting this multi-magnetic head on the rotation drum, the magnetic head 26 is installed so that it preceedingly contact with the tape.

With the magnetic head of the present invention, a negative pressure is generated by virtue of the grooves in the sliding face of the magnetic head, and the conditions of the contact between the tape and the preceding magnetic head 26 and that between the tape and the following magnetic head 27 become stable and improved. Therefore, it is no more necessary to carry out magnetic head fitting in an initial period.

In addition, the projection amount of the magnetic head can be set lower than that of a conventional head. Furthermore, since the contact characteristic of the tape is improved, the core width Wt at the sliding face can be made larger; and therefore, the face pressure received by the magnetic head can be lowered thereby to lower the amount of wear.

Although the two types of magnetic heads, that is, the first magnetic head 26 and the second magnetic head 27, are used for the present embodiment, two magnetic heads of the same type in either of the two types may be installed adjacent to each other on the head base 28.

Alternatively, three or more magnetic heads can be installed on the head base 28 so that they can be formed into a multi-magnetic head.

Furthermore, in the present embodiment, an example comprising the magnetic heads in accordance with the embodiments 1 and 4 was explained. However, an excellent technological effect may also be obtained by changing the combination of plural magnetic heads. Such cases will be explained next.

In a magnetic recording/reproducing apparatus having a relative speed of more than 10 rns between the magnetic head and the magnetic tape, the result of the measurement of deformation at the time when the multi-magnetic head made contact with the magnetic tape, shows that the deformation of the tape over the magnetic head subsequently making contact with the tape was more moderate than the deformation of the tape over the magnetic head firstly making contact with the tape; and therefore, it was found that spacing was apt to occur at the magnetic head subsequently making contact with the tape.

In this case, it is preferable to use, for example, an ordinary magnetic head with no groove as the preceding magnetic head contacting with the tape and a magnetic head of the present embodiment as the following magnetic head contacting with the tape.

With this structure, the deformation of the tape over the following magnetic head contacting with the tape can be made like the deformation over the preceding magnetic head contacting with the tape by the effect of the grooves in the sliding face; and therefore, it is possible to provide a multi-magnetic head with less spacing.

In the present embodiment, an example comprising the magnetic heads having no protective film on the sliding faces of the embodiments 1 and 4 was explained, but the magnetic heads having a protective film of the embodiments 2, 3 and 5 may be used in combination. In such case, the wear resistance is further improved by the protective film.

((Embodiment 7))

Figure 12:
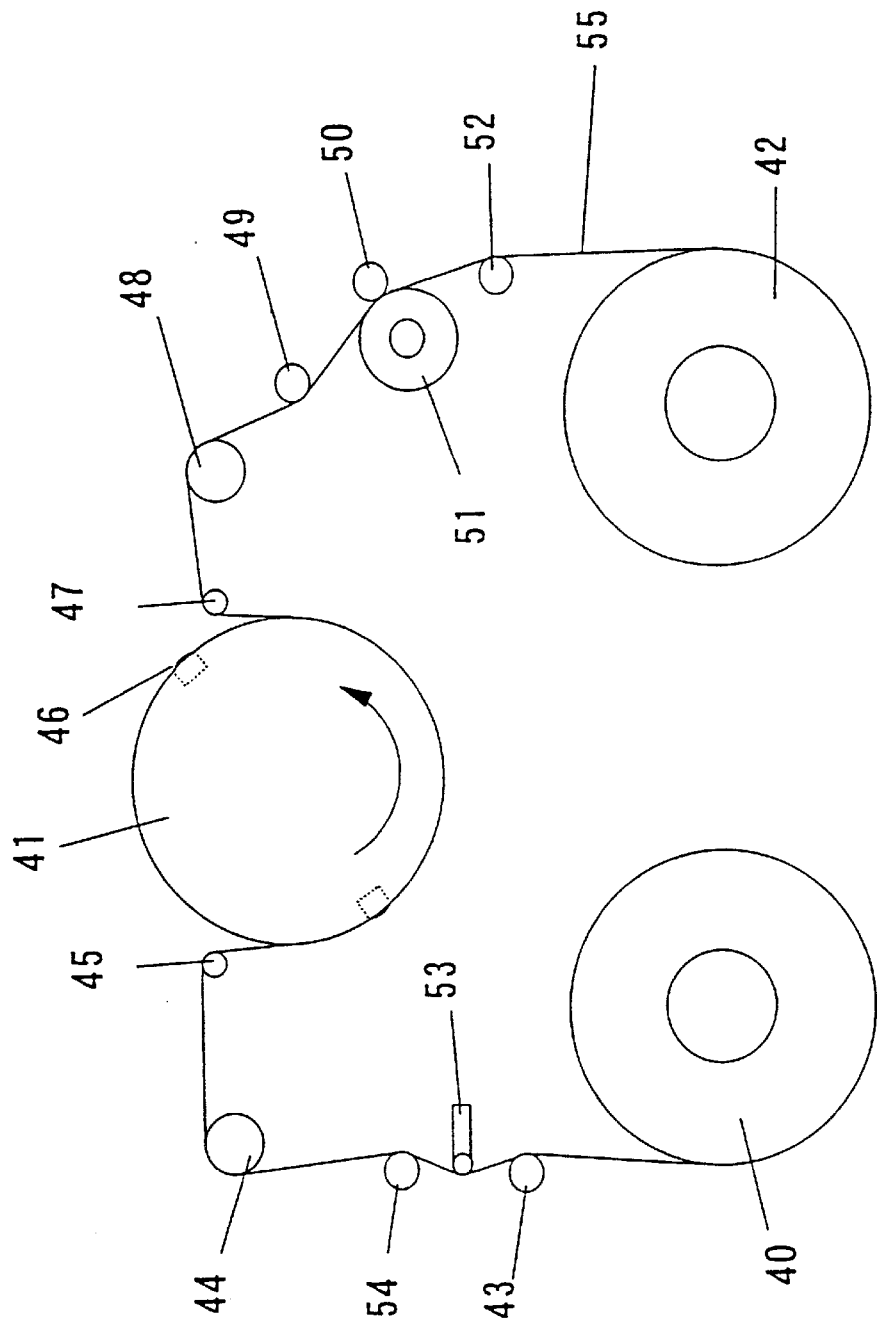
FIG. 12 is a general view showing the travel system of a magnetic recording/reproducing apparatus in accordance with embodiment 7 of the present invention.

FIG. 12 is a plan view showing a travel system of a VHS-format VTR. This VTR comprises a rotation drum device 41 provided with the magnetic heads of the embodiment 2 of the present invention as magnetic heads 46, a supply reel 40, a take-up reel 42, rotation posts 43, 44, 48, 49, 52 and 54, slant posts 45 and 47, a capstan 50, a pinch roller 51 and a tension arm 53. Numeral 55 designates a magnetic tape.

The magnetic tape 55 wound on the supply reel 40 travels by means of pulling operation by the pinch roller 51 and the capstan 50, is pressed against the heads 46 mounted on the rotation drum device 41 by the guide of the slant posts 45 and 47, passes between the pinch roller 51 and the capstan 50 and is wound up on the take-up reel 42.

The rotation drum device is an upper rotation drum type, and two magnetic heads 46 are installed being projected by 25 μm from the side face of the rotation drum.

In the magnetic recording/reproducing apparatus having the structure of the present embodiment, since wear can be suppressed by the protective film of the magnetic head 46, the depth of the gap can be decreased and high head output can be obtained.

In addition, since the projection amount of the magnetic head in an initial stage of use of the apparatus can be made smaller than that of the conventional head, damage to the tape can be reduced; and in addition, since the tape is attracted by the effect of the grooves in the sliding face of the magnetic head, the contact condition between the magnetic head and the magnetic tape can be maintained properly.

In this embodiment, the structure wherein the magnetic heads 46 of the embodiment 2 are installed on the rotation drum device 41 was explained, but it is needless to say that the magnetic heads of the embodiments 1 and 3 can be installed on the rotation drum device 41.

((Embodiment 8))

Figure 13:
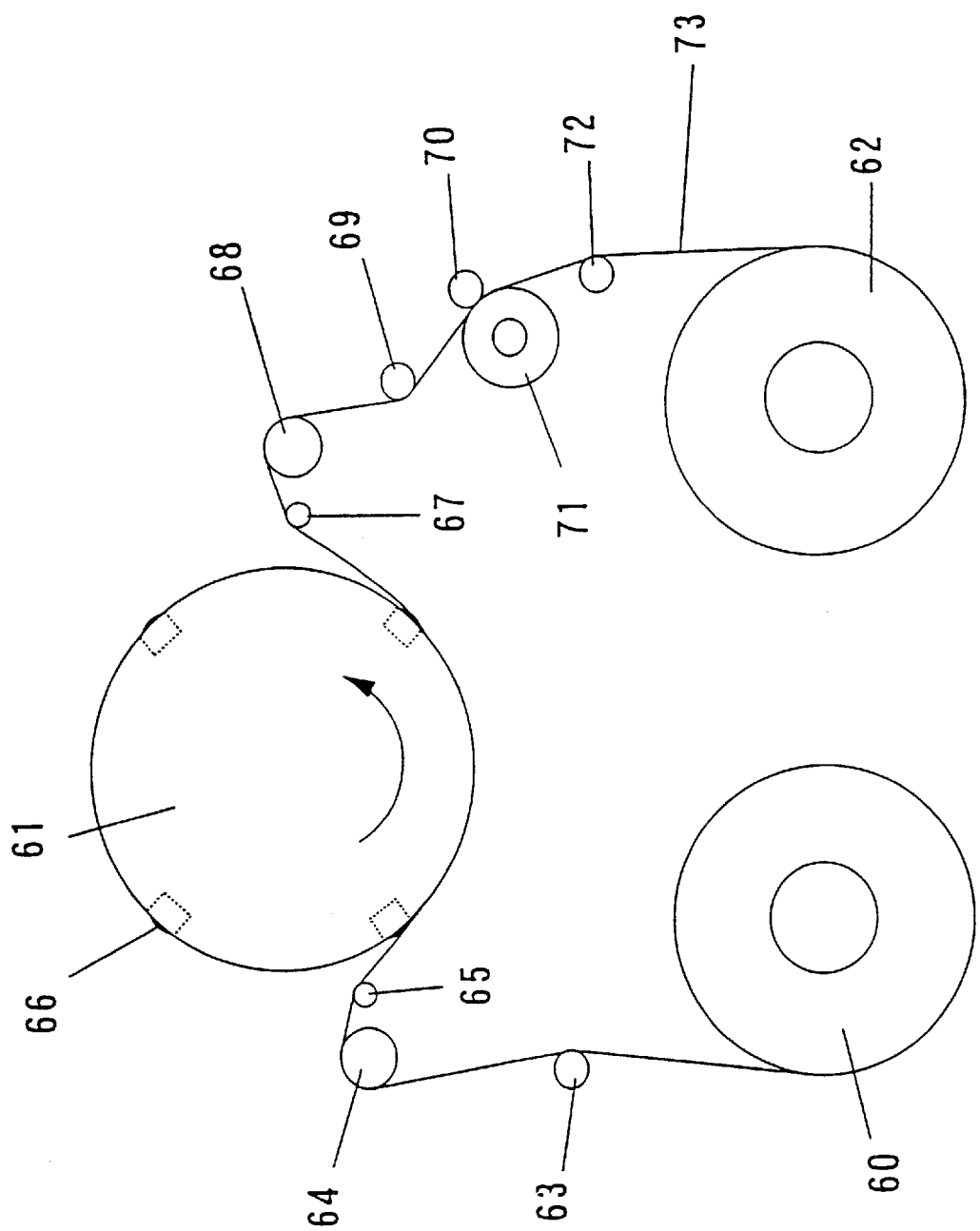
FIG. 13 is a general view showing the travel system of a magnetic recording/reproducing apparatus in accordance with embodiment 8 of the present invention.

FIG. 13 is a plan view showing a travel system of a DDS (digital data storage) apparatus. The DDS-type magnetic reproducing apparatus comprises a rotation drum device 61 mounting thereon the magnetic heads of the embodiment 5 of the present invention as magnetic heads 66a, supply reel 60, a take-upreel 62, rotation posts 63, 64, 68, 69 and 72, slant posts 65 and 67a, capstan 70 and a pinch roller 71. Numeral 73 designates a magnetic tape.

The magnetic tape 73 wound on the supply reel 60 travels by pulling operation of the pinch roller 71 and the capstan 70, is pressed against the heads 66 mounted on the rotation drum device 61 by the guide of the slant posts 65 and 67, passes between the pinch roller 71 and the capstan 70, and is taken up on the take-up reel 62.

The rotation drum device is of middle rotation drum type, and four magnetic heads 66 are installed being projected by 10 μm from the side face of the rotation drum.

In the magnetic recording/reproducing apparatus having the structure of the present embodiment, since wear can be suppressed by the protective film of the magnetic head 66, the depth of the gap can be decreased and high head output can be obtained.

In addition, since the projection amounts of the magnetic heads in an initial period can be made smaller than that of the conventional head, damage to the tape can be reduced, and in addition since the tape is attracted by the effect of the grooves in the sliding face of the magnetic head, the contact condition between the magnetic heads and the magnetic tape can be maintained properly.

In the drum device of the middle rotation drum type, since the floating amount of the magnetic tape is smaller than that in the case of the upper rotation drum device of the embodiment 7, the deformation amount of the tape near the magnetic head increases, the tape contacts the head hard and spacing occurs near the gap, thereby causing problems of reduced output and other problems.

According to the magnetic recording/reproducing apparatus, by the effect of the grooves in the sliding face of the magnetic head in the direction of the rotation axis, there is a technical effect of relieving deformation of the tape in the width direction of the magnetic head and in improving the contact condition between the magnetic head and the magnetic tape.

Although the magnetic heads 66 of the embodiment 5 have been used as the magnetic heads for this embodiment, it is needless to say that the present embodiment can be structured by using the magnetic heads in accordance with the embodiments 1 to 4.

((Embodiment 9))

Figure 14:
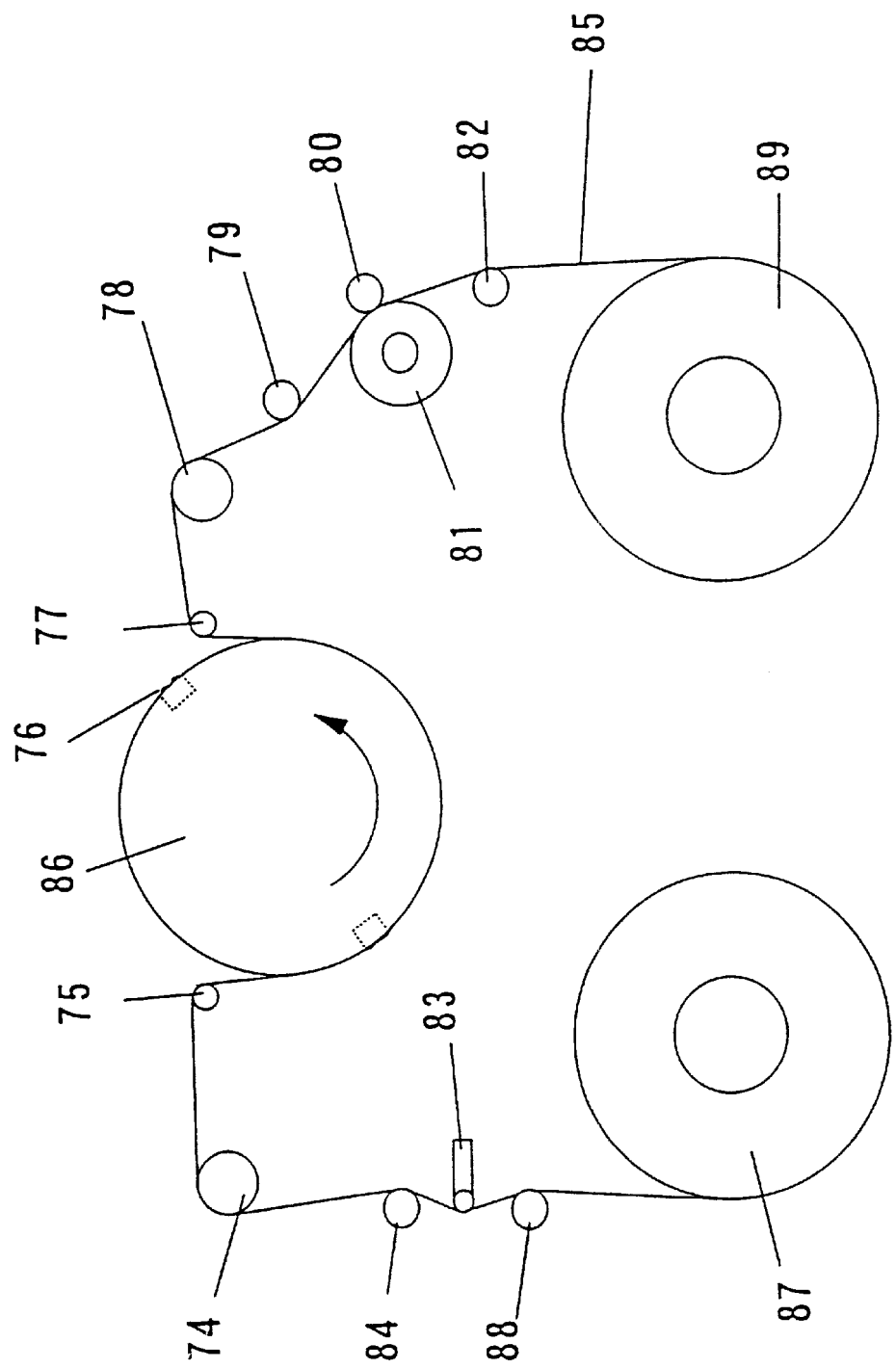
FIG. 14 is a general view showing the travel system of a magnetic recording/reproducing apparatus in accordance with embodiment 9 of the present invention.
Figure 15:
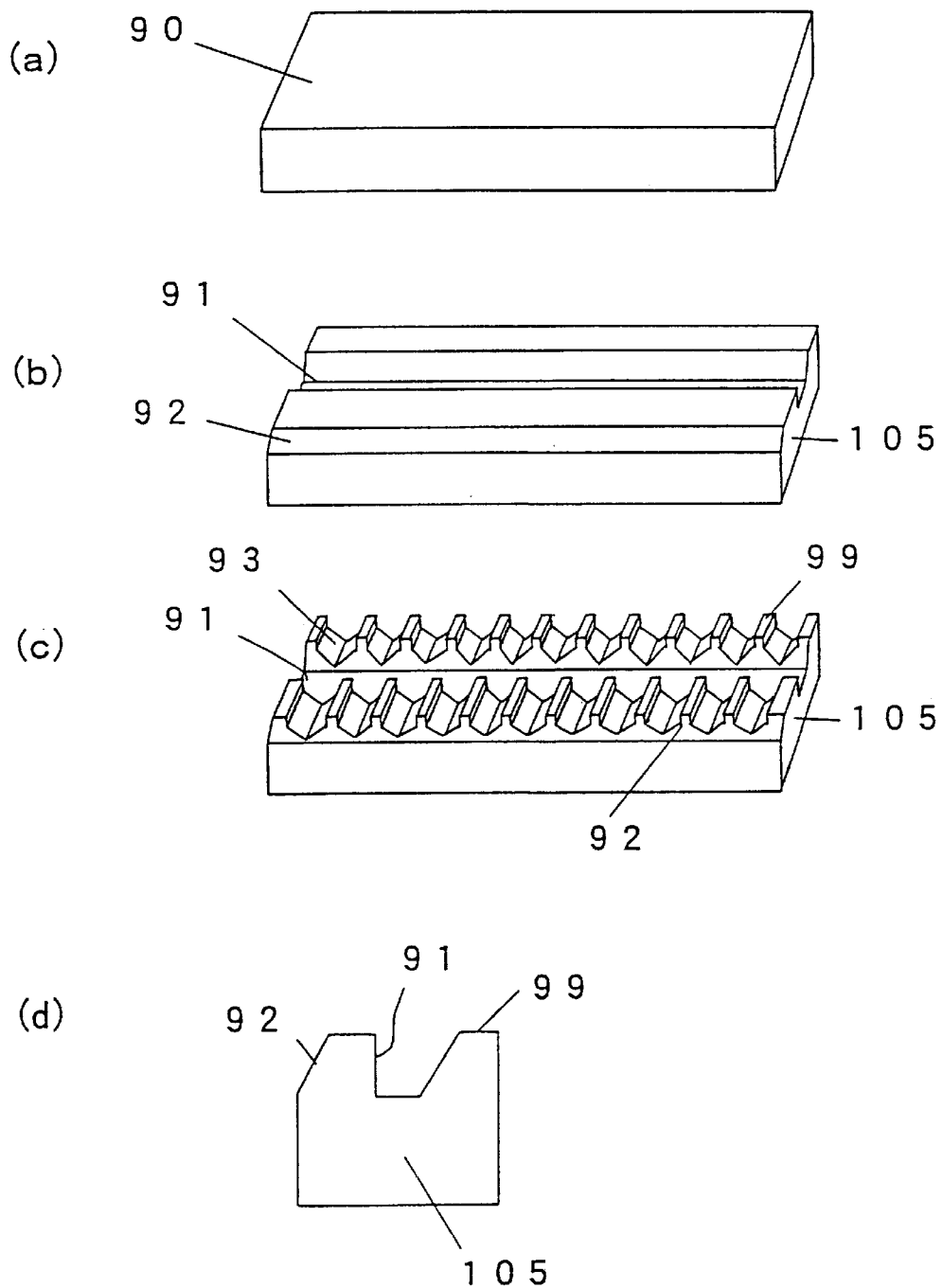
FIGS. 15(a)–15(d) show a production process of a half core block in accordance with embodiment 10 of the present invention.
Figure 16:
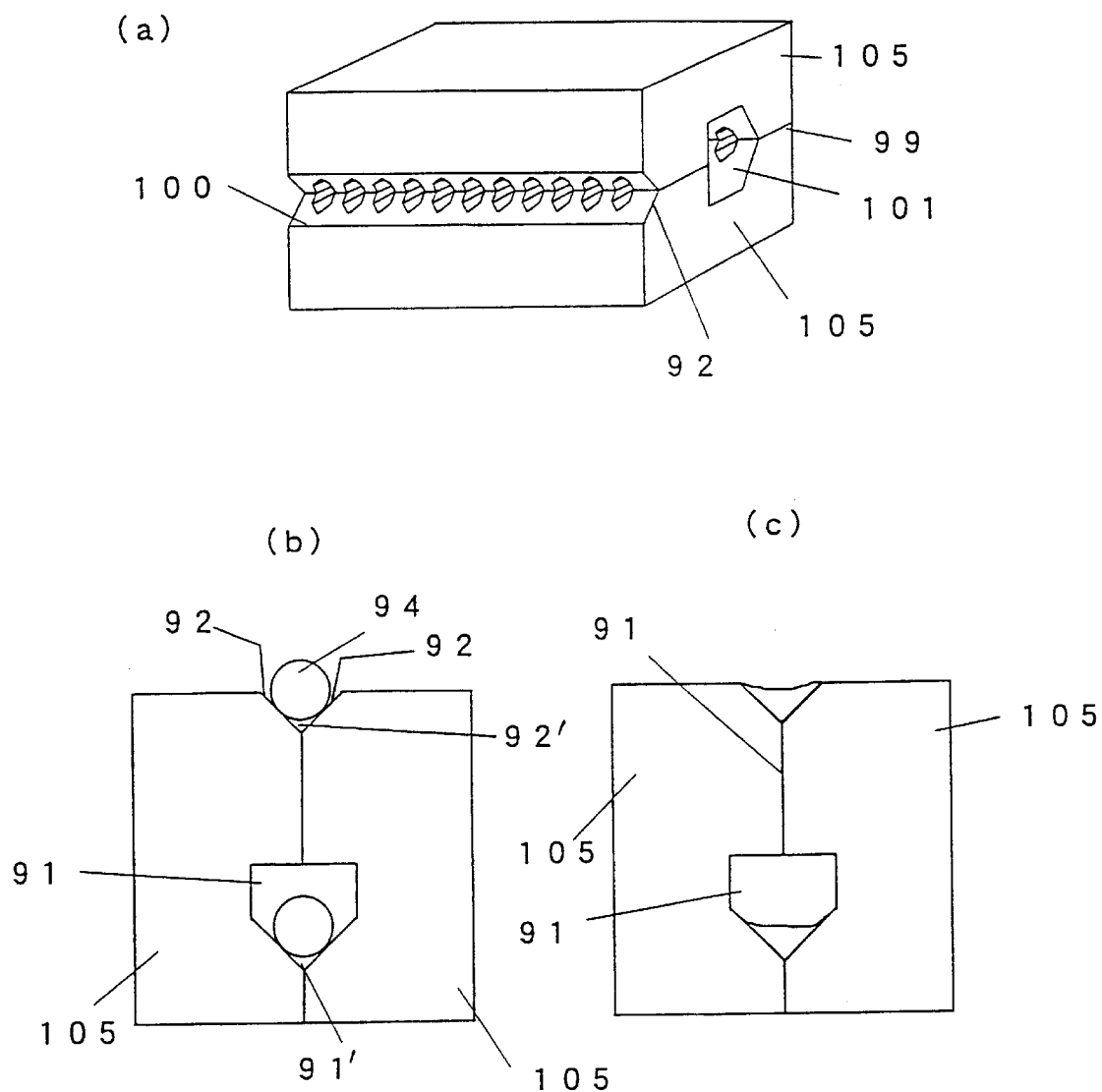
FIGS. 16(a)–16(c) show a process of butting a pair of half cores before welding by using bonding glass in accordance with embodiment 10 of the present invention.

FIG. 14 is a general view showing a travel system of a DV (digital video) type VTR. The DV-type magnetic recording/reproducing apparatus comprises: a rotation drum device 86 provided with the multi-magnetic heads of the embodiment 6 of the present invention as multi-magnetic heads 76, a supply reel 87, a take-up reel 89, rotation posts 88, 84, 74, 78, 79 and 82, slant posts 75 and 77, a capstan 80 and a pinch roller 81. Numeral 85 designates a magnetic tape.

The magnetic tape 85 wound on the supply reel 87 travels by pulling operation of the pinch roller 81 and the capstan 80, is pressed against the multi-magnetic heads 76 mounted on the rotation drum device 86 by the guide of the slant posts 75 and 77, passes between the pinch roller 81 and the capstan 80, and then is taken up on the take-up reel 89.

The rotation drum device of the present embodiment is an upper rotation drum type, and two sets of multi-magnetic heads 76 are installed being projected by 15 $\mu$m from the side face of the rotation drum.

In the magnetic recording/reproducing apparatus having the structure of the present embodiment, since wear can be suppressed by the protective film of the magnetic head 76, the depth of the gap can be decreased and high head output can be obtained. In addition, since the projection amount of the magnetic head in an initial stage can be made smaller than that of the conventional head, damage to the tape can be reduced; in addition, since the tape is attracted by the effect of the grooves in the sliding face of the magnetic head, the contact condition between the magnetic head and the magnetic tape can be maintained properly.

In the case when a drum device provided with the multi-magnetic heads just as in the present embodiment was rotated at the double speed of a conventional rotation speed by rotation speed switching for example, the wear amount of the preceding magnetic head contacting the tape sometimes becomes larger than that of the following magnetic head contacting with the tape when rotation is made at the doubled speed, contrasted to the case that the two magnetic heads are wore away equally at the conventional rotation speed. The reason is supposed that the contact condition between the tape and the magnetic head changed owing to the increased rotation speed of the drum.

The problem that the preceding magnetic head contacting with the tape wears away much more significantly owing to the above-mentioned phenomenon is prevented when using the magnetic recording/reproducing apparatus having the constitution of the present embodiment. In other words, since the magnetic tape is attracted to the magnetic head by the negative pressure owing to the effect of the grooves formed on the sliding face of the magnetic head, uneven wear is eliminated.

((Embodiment 10))

Referring to FIG. 15 to FIG. 20, a method of producing the magnetic head of the present invention will be described. First, a ferromagnetic oxide substrate 90 formed of, for example, a Mn-Zn ferrite block shown in FIG. 15(a) is prepared, the surfaces of which are processed to have excellent parallelism and flatness by lapping or other processing. Then, a groove portion 91 for winding and a chamfered slant portion 92 are formed as shown in FIG. 15(b), and track grooves 93 shown in FIG. 15(c) for track regulation are formed. The width of each ridge portion remaining uncut between the track grooves 93 adjacent to each other substantially regulates the width of the track. FIG. 15(d) is a side view of the half magnetic head core block 105 made in this way as viewed from the right to the left of FIG. 15(c).

Next, a pair of half core blocks processed in the same way and having substantially the same shape is prepared; both half core blocks are butted each other as shown in FIG. 16(a) with a gap material having a predetermined thickness and preferably formed of $SiO_2$ being disposed on either or both of the right and left sides of the upper face 99 (FIG. 15(d)) to be used as a magnetic gap forming face. The pair of core blocks overlaid as shown in FIG. 16(a) is fixed with a jig (not shown) so that the relationship between them does not change.

The pair of core blocks 105 and 105 overlaid and fixed with the jig as described above is placed as shown in FIG. 16(b) so that the V-section groove 92 formed by the chamfered slant portions 92 and 92 being disposed opposite to each other faces upward.

Then, as shown in FIG. 16(b), a cylindrical piece of bonding glass 94 is placed in the V-section groove 92, and another piece of cylindrical bonding glass 94 is placed in the V-shaped portion 91 positioned at the lower end of the winding groove portion 91 formed at the central portion of the pair of core blocks 105 and 105; and the pair is put into a heating furnace and heated at about 700° C.

As the result of the heating, the bonding glass 94 is melted as shown in FIG. 16(c), thereby performing welding at the above-mentioned V-section groove 92 and the V-shaped portion 91 positioned at the lower end of the winding groove portion 91, and the pair of head cores 105 and 105 is adhered.

Next, the core block formed of the pair of cores assembled and bonded as described above is placed upside down as shown in FIG. 17 and sliced with dicing saws at the cutting sections indicated by the broken lines, thereby to obtain individual head chips. At the time of the slicing, cutting is performed with consideration of a predetermined azimuth angle.

Figure 18:
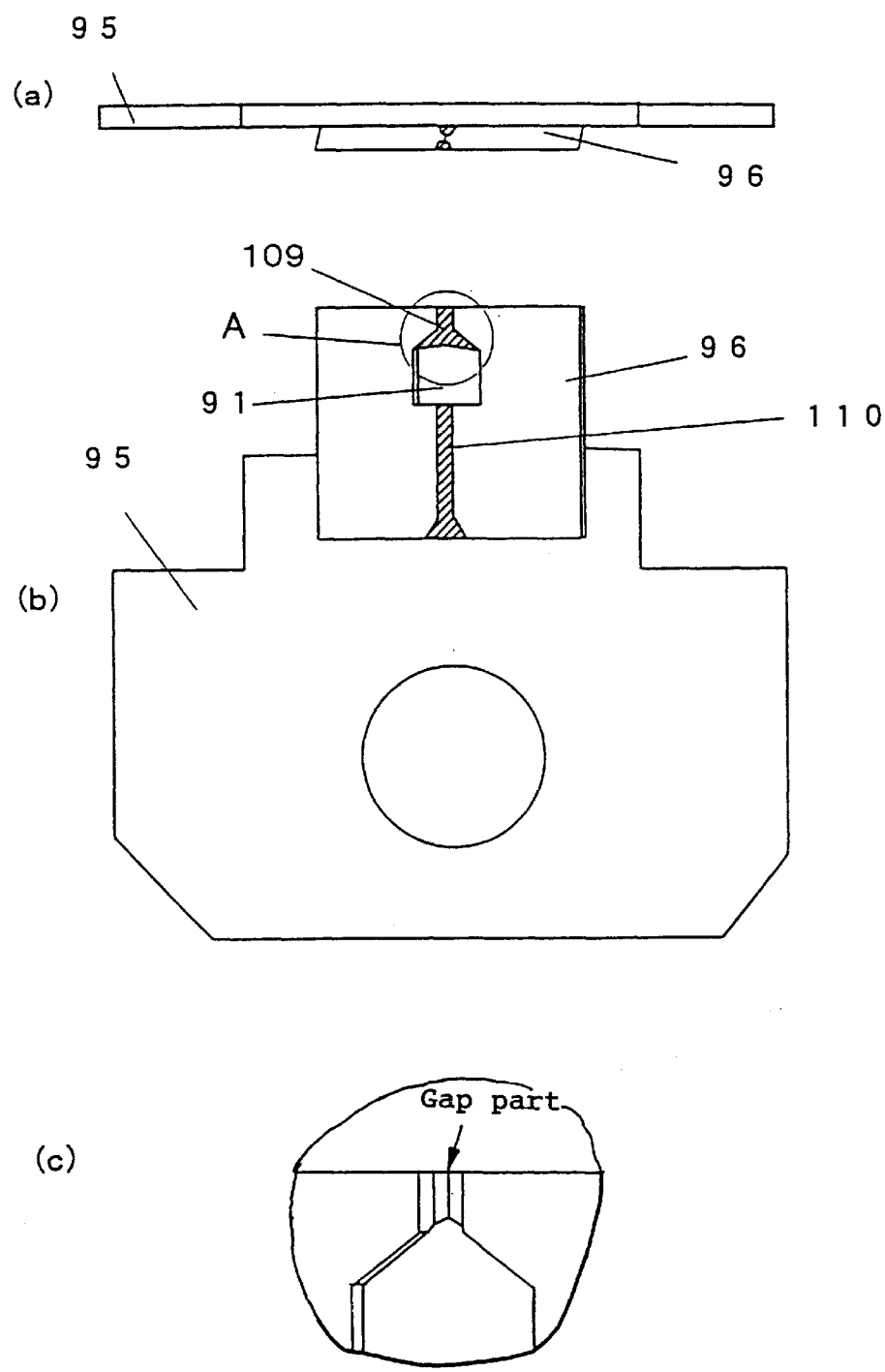
FIG. 18(a) is a front external view showing a head chip bonded to a head base in accordance with the embodiment 10 of the present invention.
FIG. 18(b) is a side elevational view of the head chip of FIG. 18(a)
FIG. 18(c) is an enlarged view of a gap of the head chip of FIG. 18(a)

Furthermore, as shown in FIG. 18, the head chip 96 obtained in such way is bonded with an ultraviolet curing resin to a head base 95 preferably made of brass. The ultraviolet curing resin is used in order that the bonding agent is cured in a short period after a desired time. Next, the sliding face of the head is ground by a lapping tape so that the radii of curvature of the sliding face have values best suited for a drum device on which the head is mounted.

Figure 19:
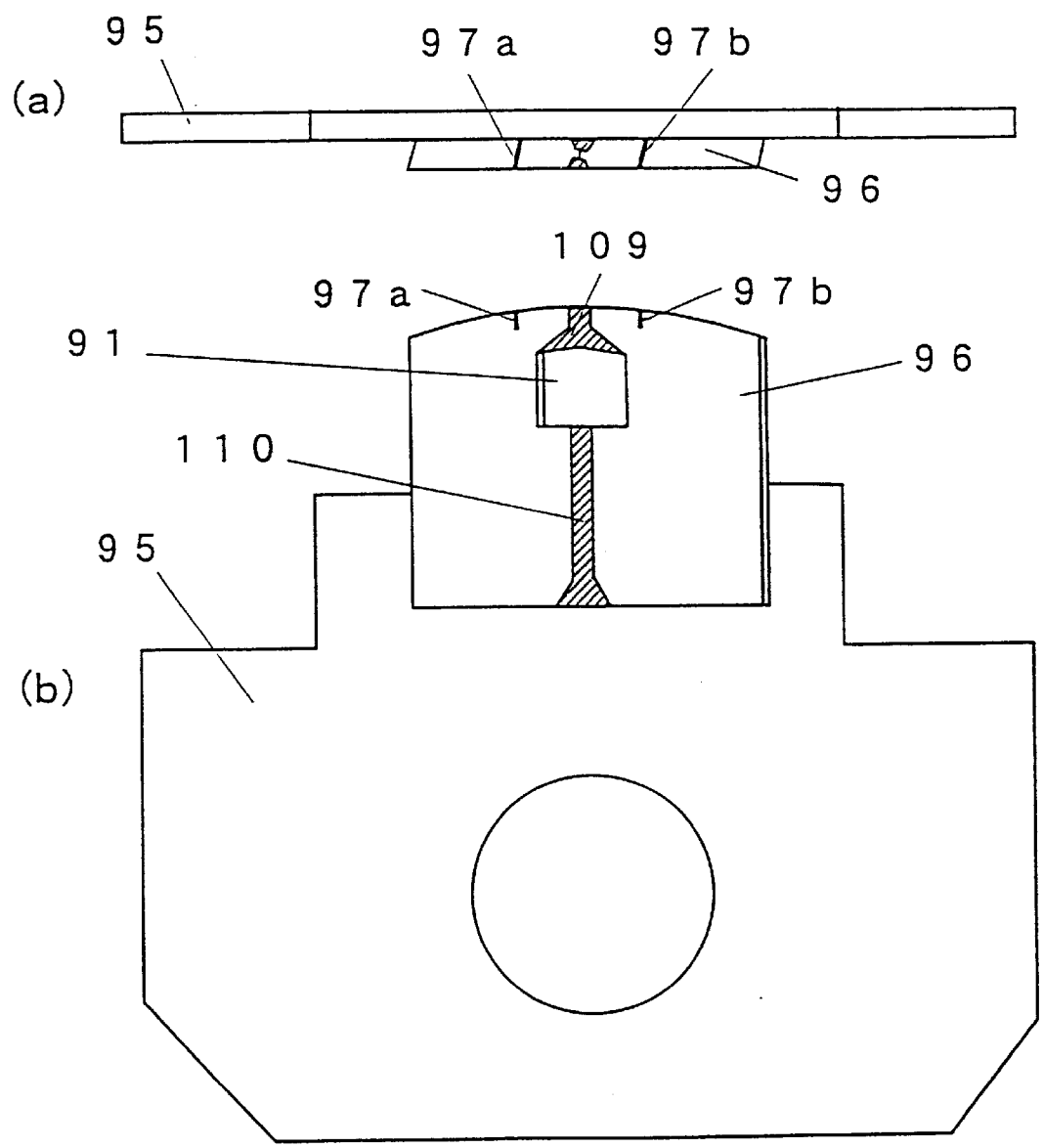
FIG. 19(a) is a front view showing grooves formed in the sliding face of the head in accordance with the embodiment 10 of the present invention.
FIG. 19(b) is a side elevation view of the head of FIG. 19(a)

On the properly prepared sliding face of the magnetic head, grooves are formed at desired positions in desired directions as the features of the present invention by using dicing saws. For example, two grooves 97a and 97b in total preferably measuring 30 $\mu$m in width, 60 $\mu$m in depth and preferably about 200 $\mu$m in length extending along the overall thickness of 200 $\mu$m of the head, are formed at positions 300 $\mu$m in the longitudinal direction on both sides of the gap formed in a direction about the direction towards the rotation axis of the rotation drum as shown in FIG. 19.

Figure 20:
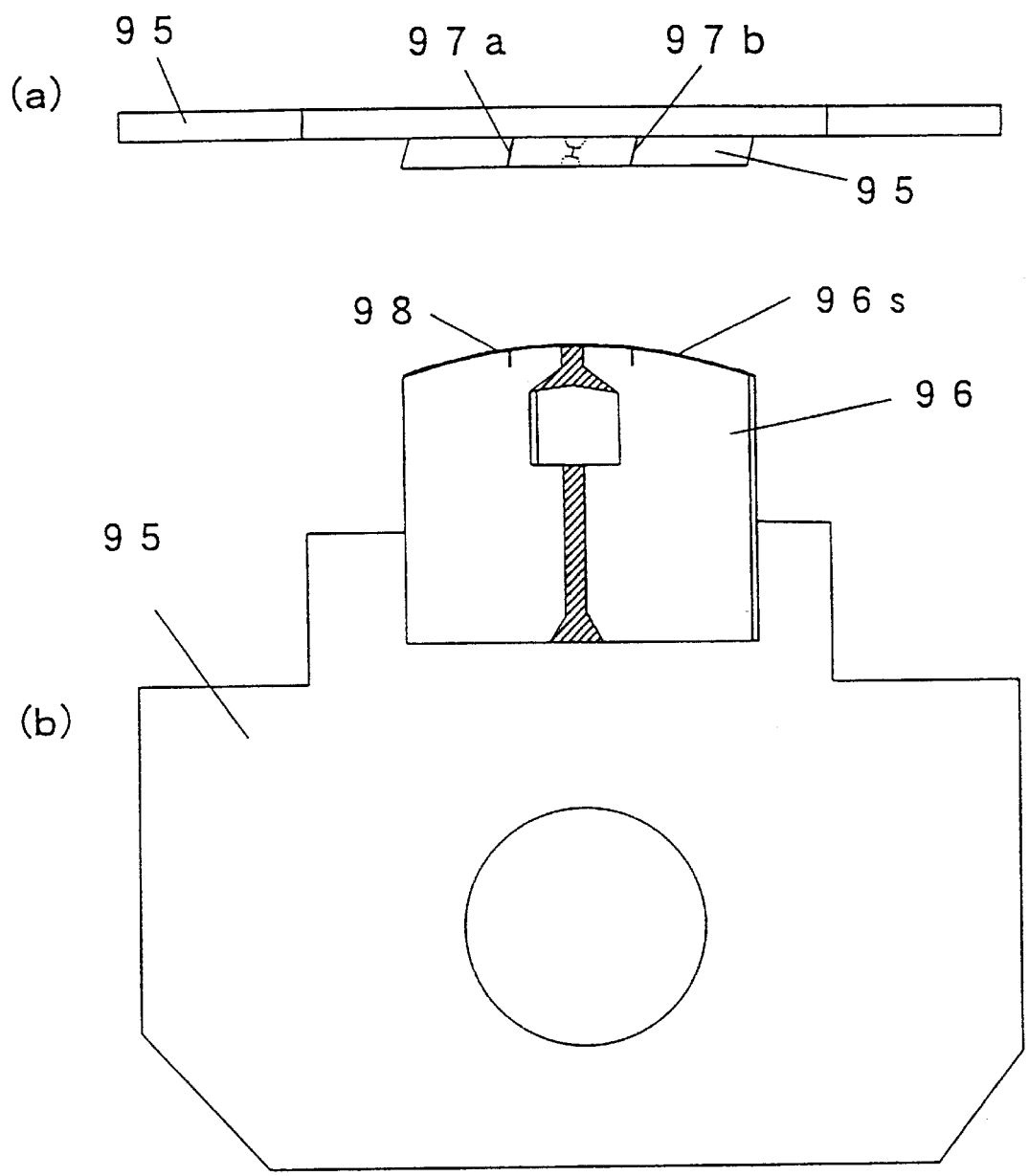
FIG. 20(a) is a front view showing a protective film formed on the sliding face of the head in accordance with the embodiment 10 of the present invention.
FIG. 20(b) is a side elevational view of the head of FIG. 20(a)

Next, as shown in FIG. 20, a protective film 98 of diamond-like carbon, having a thickness of 30 $\mu$m, is formed on the sliding face 96s of the magnetic head by the plasma CVD method for example. Then, a winding (not shown) is provided on the magnetic core; consequently, the head is completed.

In the present embodiment, although a method of producing the magnetic head of the embodiment 5 was explained, the magnetic heads of the embodiments 2 and 3 can also be produced by using the same method. However, the direction, width and depth of the groove are changed depending on the corresponding embodiment as a matter of course. By installing a plurality of these heads on a head base, a multi-magnet head in accordance with the embodiment 6 can be obtained.

Although, in the present embodiment, an example using $SiO_2$ as a gap material was explained $ZrO_2$, $Ta_2O_5$, glass, Cr or composites of these can be used as the gap material of the magnetic head of each embodiment.

Figure 17:
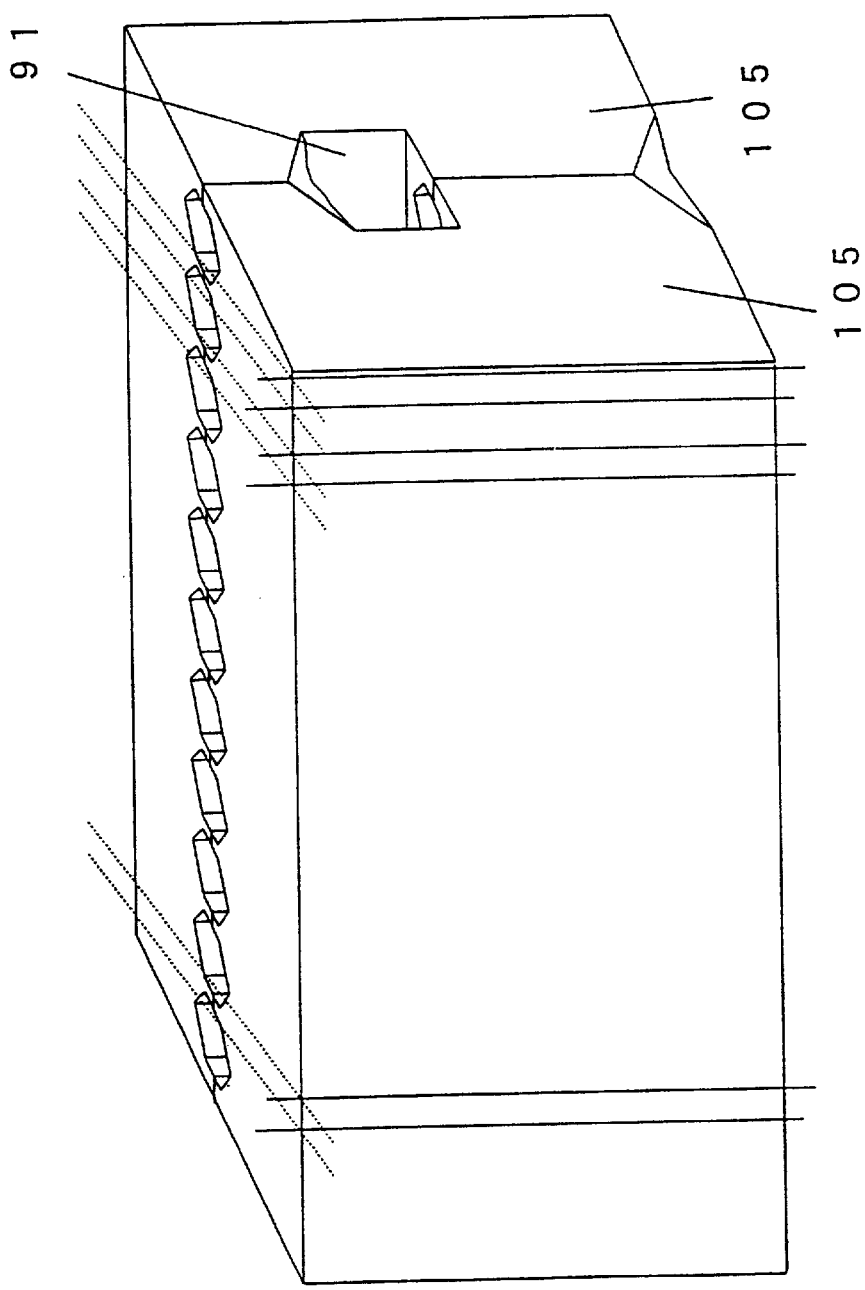
FIG. 17 is a view showing positions at which the assembly obtained by butting the pair of half cores in accordance with the embodiment 10 of the present invention is sliced by a dicing saw.

In the present embodiment, although an example wherein the head chip was bonded to the head base and its sliding face was ground and then the grooves were formed was explained; the individual head chips may be produced by carrying out desired grooving before carrying out the slicing shown in FIG. 17.

In the present embodiment, although an example of using the dicing saw was described as a grooving method, other methods using electric discharge machining, laser processing, photolithography and ion milling, and chemical etching may also be used as methods for forming the grooves. Since the depth of the groove can be changed in electrostatic discharge and laser processing, it is possible to produce magnetic heads having various shapes.

((Embodiment 11))

Figure 21:
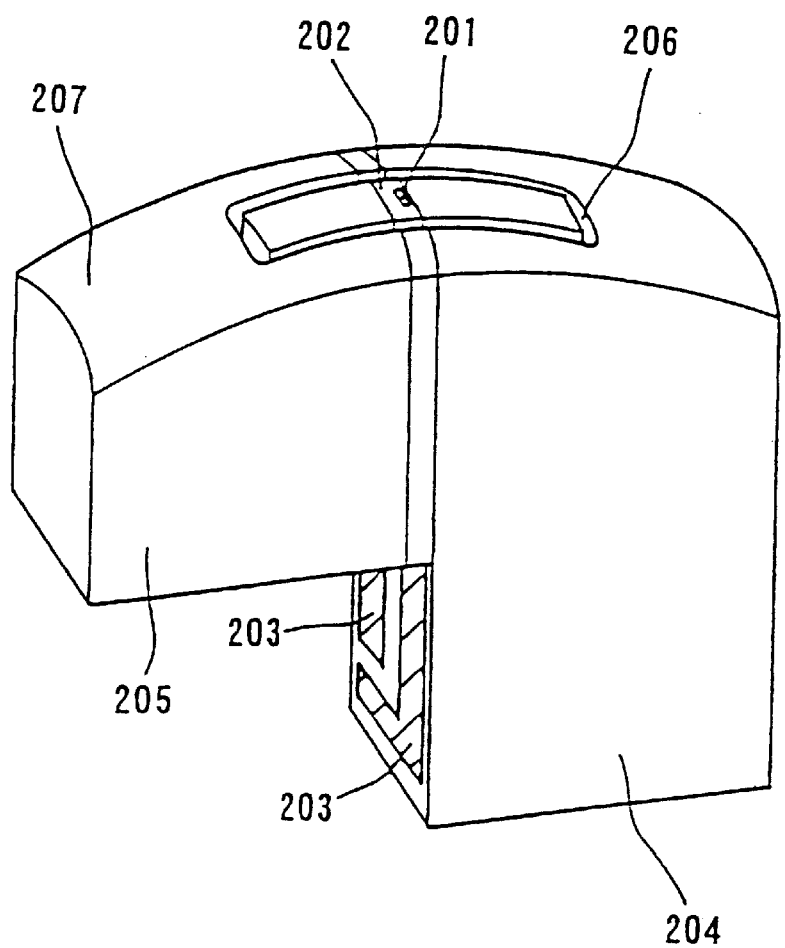
FIG. 21 is a perspective view showing a head chip in accordance with an embodiment of the thin-film magnetic head of the present invention.

FIG. 21 shows a thin-film magnetic head as an example of a head; this head is a MR head having a magnet-resistive effect element (hereinafter referred to as a "MR element") 201 with a predetermined pattern of a magnetic material having the anisotropic magnet-resistive effect, preferably NiFe and FeCo, in addition, or a magnetic material having the giant magnet-resistive effect.

The MR element 201 is attached to a protective film 202 so as to be protected and is held between a pair of substrates 204 and 205. The protective film 202 is disposed at least on one side of the MR element 201.

The protective film 202 should preferably be formed of a nonmagnetic material of borosilicate glass, etc. In addition to borosilicate glass, low-melting point glasses of lead glass, etc., oxides of $Al_2O_3$, $SiO_2$,etc., and a nitrides of $Si_3N_4$ TaN, etc., are suitable.

Furthermore, as a material of the substrates 204 and 205, materials having excellent wear resistance of $Al_2O_3$-TiC (hereinafter referred to as "altic"), etc., are preferable.

In addition to altic, it is possible to use magnetic ferrites of MnZn ferrite and NiZn ferrite, nonmagnetic ferrites of Zn ferrite, etc., and ceramics of ax-hematite, $NiO—TiO_2—MgO$, $TiO_2—CaO$ and $NiO—MnO$, etc. The substrates should preferably be formed of a nonmagnetic material to reduce the magnetic effect of the thin-film magnetic head.

A nearly rectangular groove (dent portion) 206 is formed around the magnetic core including the MR element 201 on a sliding face 207 making contact with a magnetic tape. The groove 206 is formed by processing the substrates 204 and 205 and the protective film 202 to have a predetermined width and depth. This groove 206 is formed by electric discharge machining, for example.

Although not limited particularly, the width of the groove should preferably be 10 $\mu$m or more and 100 $\mu$m or less, for example about 60 $\mu$m, and the depth of the groove should preferably be 10 $\mu$m or more and 500 $\mu$m or less. The depth is about 300 $\mu$m for example. The groove is formed in the shape of a rectangle having sides in the sliding direction (the longitudinal direction) of the magnetic tape and the sides in a direction perpendicular thereto (in the width direction).

The sliding face 207 preferably is 1 mm or more and 3 mm or less long, and is 2 mm long for example;, is be 100 $\mu$m or more and 500 $\mu$m or less wide. The width is 300 $\mu$m for example. The area of the sliding face 207 is preferably be 0.1 mm$^2$ or more. This is because the pressure to the head is reduced by having such a certain size of area.

The sliding face surrounded by the groove is preferably be 0.5 mm or more and 2 mm or less long, and is 1 mm long for example; preferably be 30 $\mu$m or more and 100 $\mu$m or less wide, and is preferably 60 $\mu$m wide for example. The area of the sliding face surrounded by the groove preferably is 0.015 mm $_2$or more and 0.2 mm $_2$or less.

In the above-mentioned thin-film magnetic head, the height of the one substrate 205 is made lower than that of the other substrate 204, thereby to expose the terminal portion 203 of the lower part of the MR element 201. This terminal portion is used for connection to an external circuit not shown.

A shielded type MR head is preferably used as a mode of MR head, but in addition to this, various types can be used, such as an unshielded type MR head, a dual stripe type MR head, a vertical type MR head, a flux guide type MR head, etc.

The MR head can be produced by forming a thin film having the magnet-resistive effect by using the sputtering method, such as the high frequency sputtering method, or the vapor deposition method, and by forming a predetermined pattern by using the photolithography and ion milling method and the chemical etching method.

In the magnetic head of the present invention, the magnetic tape is attracted to the magnetic head by the effect of the groove formed in the sliding face, and head touch is maintained properly. Furthermore, by forming this groove, it is not necessary to carry out tape fitting in an initial period.

((Embodiment 12))

Figure 22:
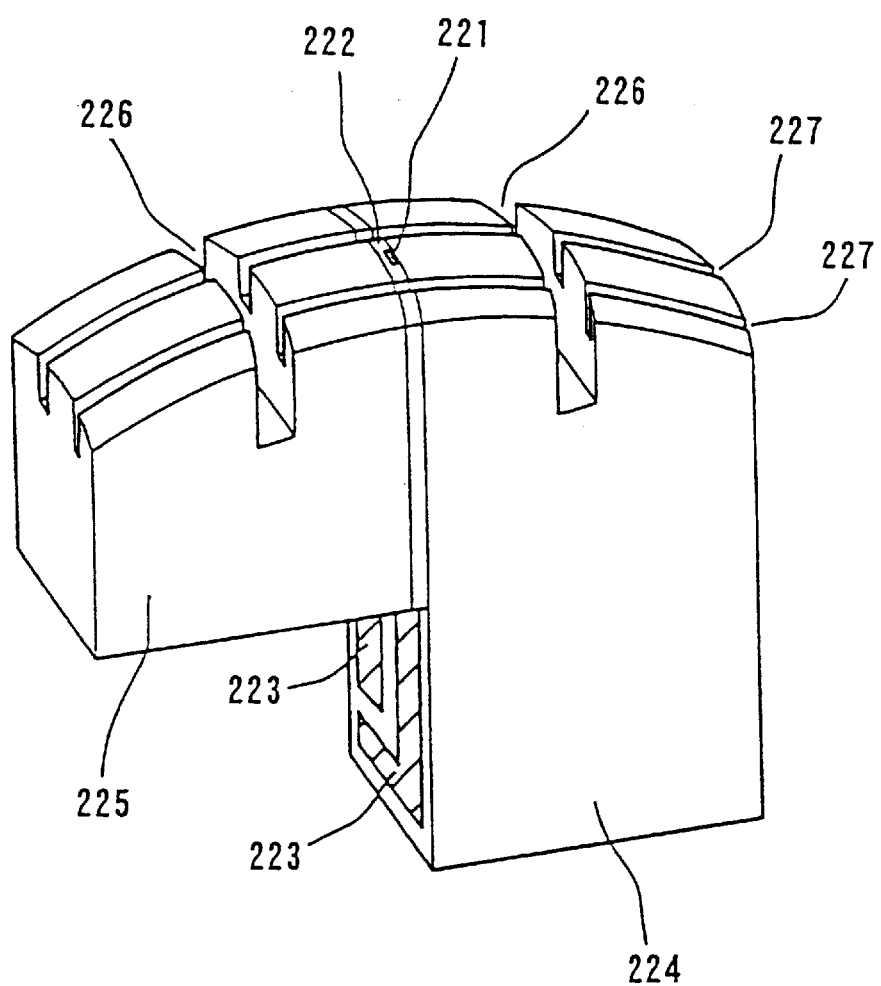
FIG. 22 is a perspective view showing a head chip in accordance with another embodiment of the thin-film magnetic head of the present invention.

In a thin-film magnetic head in accordance with an embodiment shown in FIG. 22, an MR element 221 is held between a pair of substrates 224 and 225 via a protective film 222. In FIG. 22, grooves 226 and 227 are formed in the substrates 224 and 225 and the protective film in the shape of the symbol #. The grooves 226 and 227 are respectively a pair of grooves formed in parallel with each other, and these pairs of grooves are formed in the sliding face so as to be orthogonal to each other.

The grooves 226 and 227 can be formed by grinding using a dicing saw for example. In this thin-film magnetic head, the height of the substrate 225, one of the substrates, is made lower than that of the substrate 224, the other substrate, so as to expose the terminal portion 223 disposed below the MR element 221.

Materials capable of being used for the MR element, the protective film and the respective substrates of this thin-film magnetic head are similar to those for the immediately preceding embodiment. Furthermore, the preferable ranges of the sizes and areas of the entire sliding face, the sliding face surrounded by the grooves and the grooves are similar to those described above. As the type of MR head, the above-mentioned various types can also be used.

According to the magnetic head of the present invention, the magnetic tape is attracted to the magnetic head by the effect of the grooves formed in the sliding face, and head touch is maintained properly. Furthermore, by forming the grooves, it is not necessary to carry out tape fitting in an initial period.

((Embodiment 13))

Figure 23:
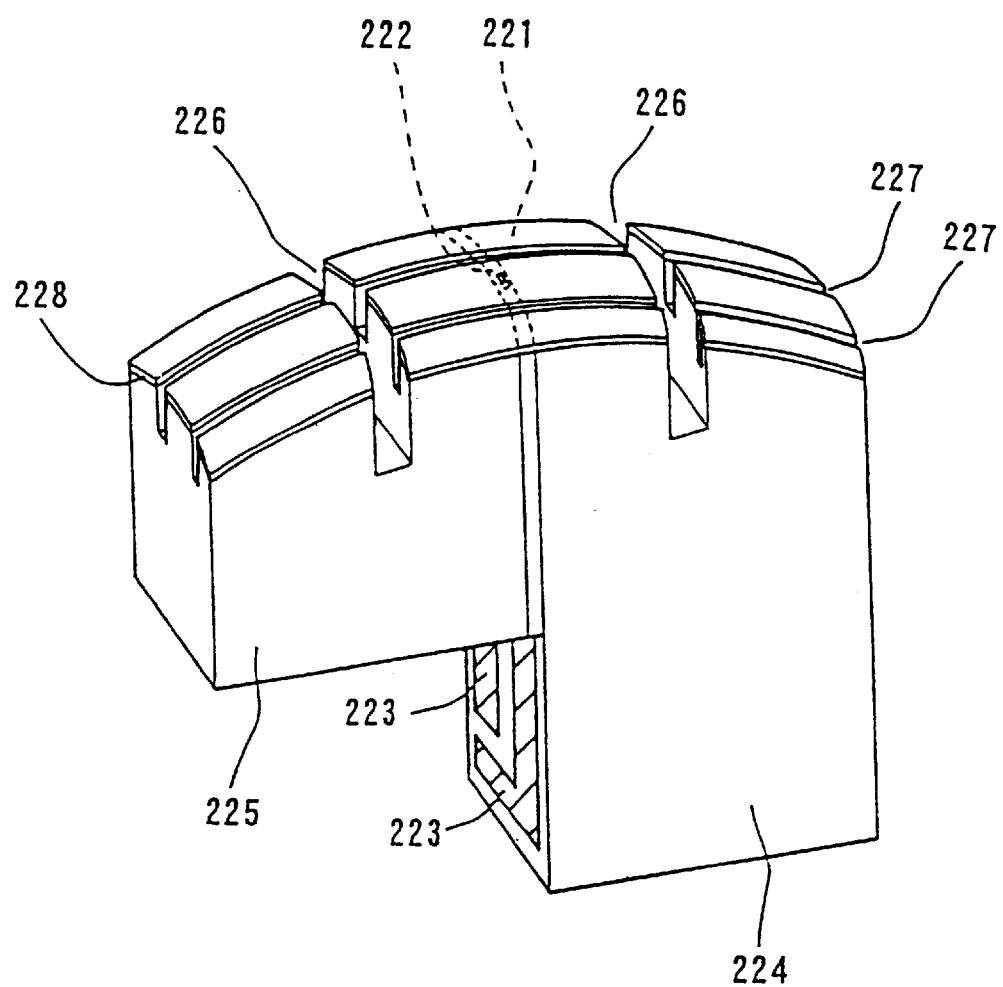
FIG. 23 is a perspective view showing a head chip in accordance with still another embodiment of the thin-film magnetic head of the present invention.

In a thin-film magnetic head shown in FIG. 23, a wear resistant film 228 is formed on the sliding face of the thin-film magnetic head shown in FIG. 22. DLC (diamond-like carbon) formed by the plasma CVD method or the like is preferable as the wear resistant film 228. The thickness of the wear resistant film 228 should preferably be 10 nm or more and 50 nm or less.

In addition to DLC, a film of cubic crystal boron nitride and thin films of SiC, CrN, diamond, carbon, TiN, TiC, $Si_3N_4$, $Al2O_3$, TaC, ZrC, etc. can be used as the wear resistant film 228.

Furthermore, in addition to the plasma CVD method, the sputtering method, ion-plating method, vapor evaporation method, etc. can be used as a method of forming the wear resistant film 228.

In the above-mentioned thin-film magnetic head with the wear resistant film, the amount of wear can be reduced in comparison with the head without the film.

((Embodiment 14))

An embodiment of a magnetic recording/reproducing apparatus in accordance with the present invention will be elucidated below referring to FIG. 24 to FIG. 27.

Figure 24:
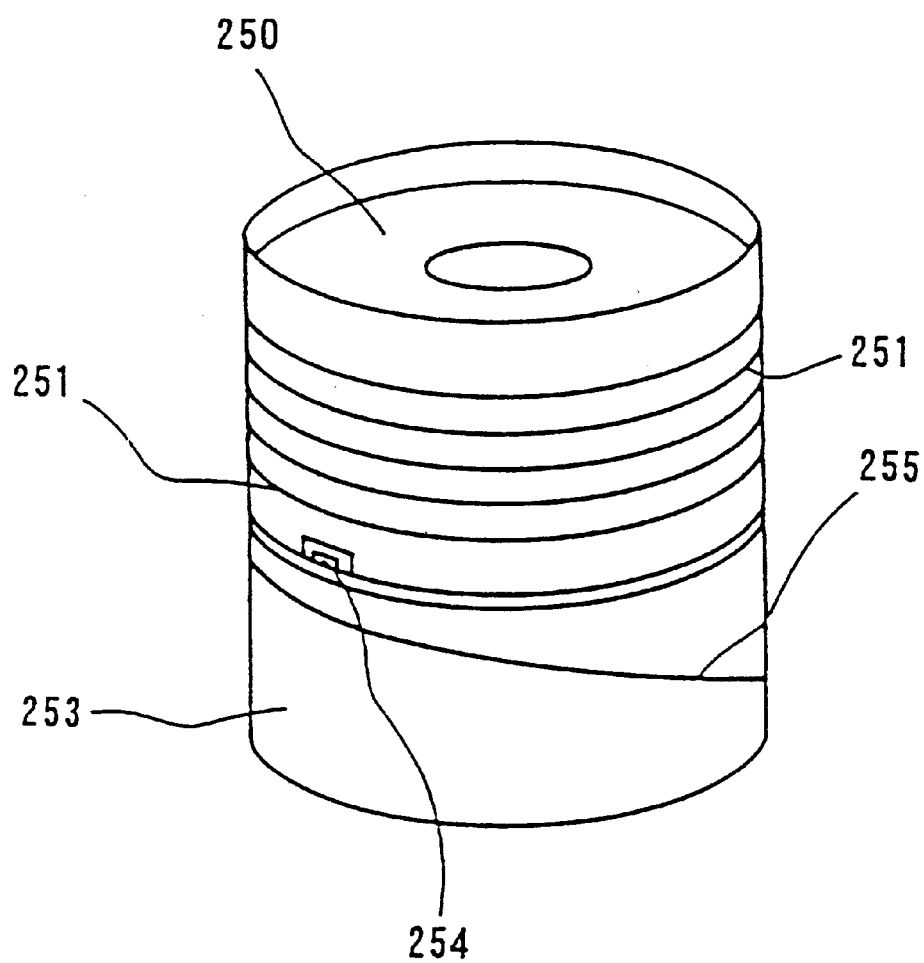
FIG. 24 is a perspective view showing a rotation drum device in accordance with an embodiment of the magnetic recording/reproducing apparatus of the present invention.

As shown in FIG. 24, the rotation drum device of the present embodiment has a lower drum 253, an upper rotation drum 250 and magnetic heads 254. In a state inclined with respect to the rotation axis of the upper rotation drum 250, a magnetic tape not shown travels along a lead 255 on the face of the drum.

In this way, the sliding face of the magnetic head 254 making contact with the magnetic tape is slanted with respect to the travel direction of the magnetic tape. In addition, plural grooves 251 are formed in the upper rotation drum 250 so that the magnetic tape stably slides while making close contact with the upper rotation drum 250; and air involved in the space between the magnetic tape and the upper rotation drum is discharged through these grooves 251.

Figure 25:
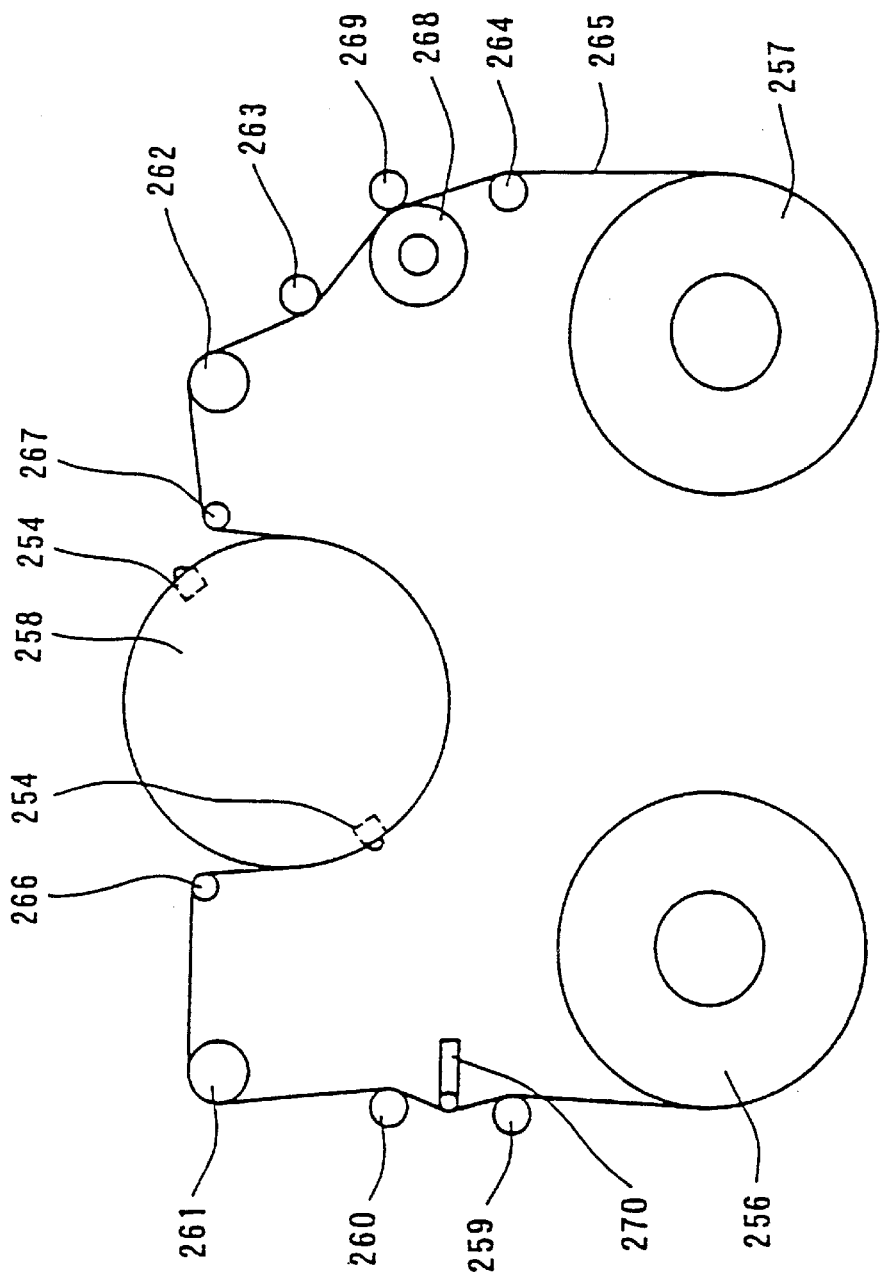
FIG. 25 is a general view showing a travel system in accordance with an embodiment of the magnetic recording/reproducing apparatus of the present invention.
Figure 26:
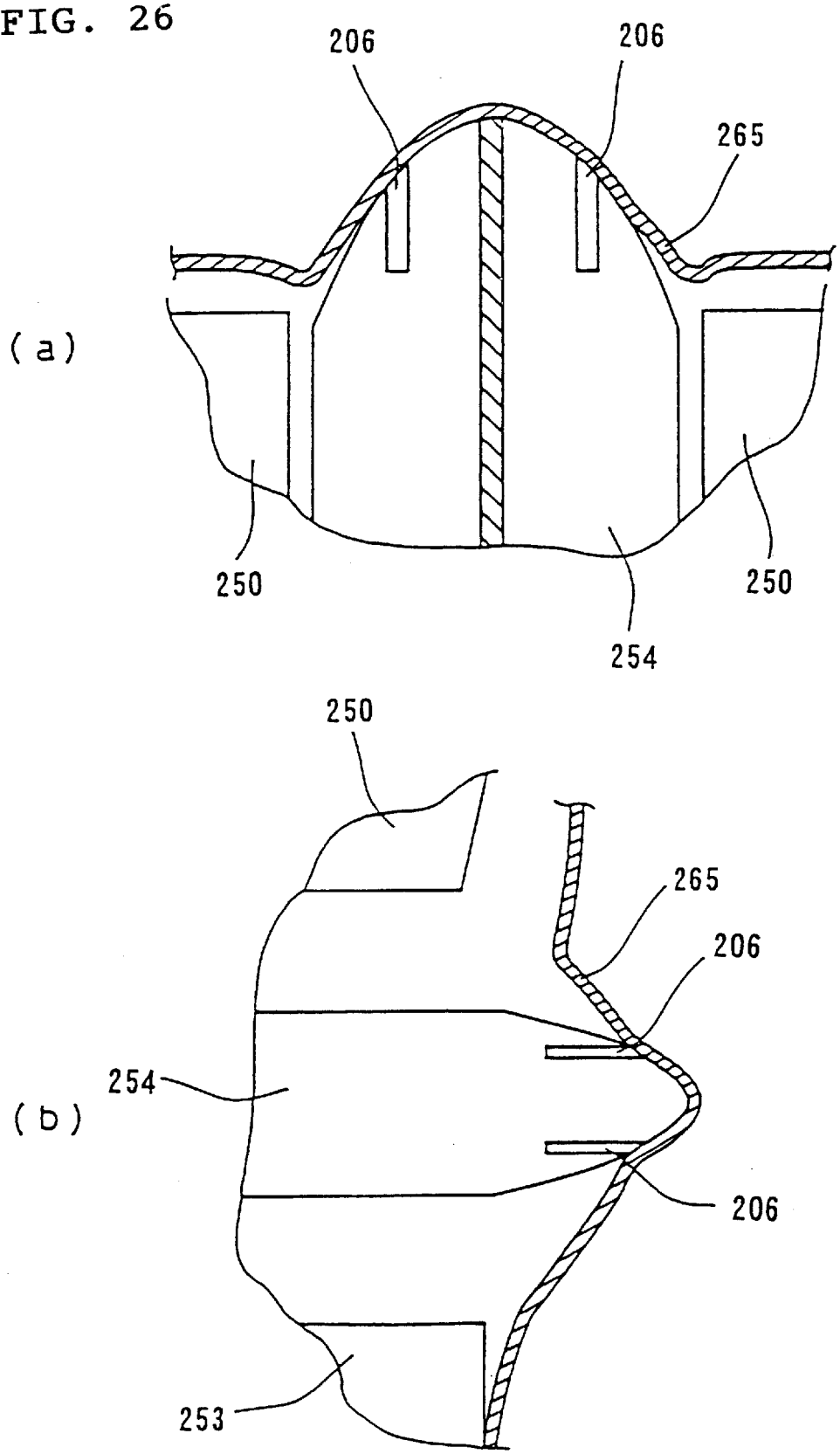
FIG. 26(a) is a view showing the deformation of the magnetic tape traveling in a conventional magnetic recording/reproduction apparatus in the sliding direction.
FIG. 26(b) is a view showing the deformation of the magnetic tape traveling in a conventional magnetic recording/reproduction apparatus in the direction perpendicular to the sliding direction.
Figure 27:
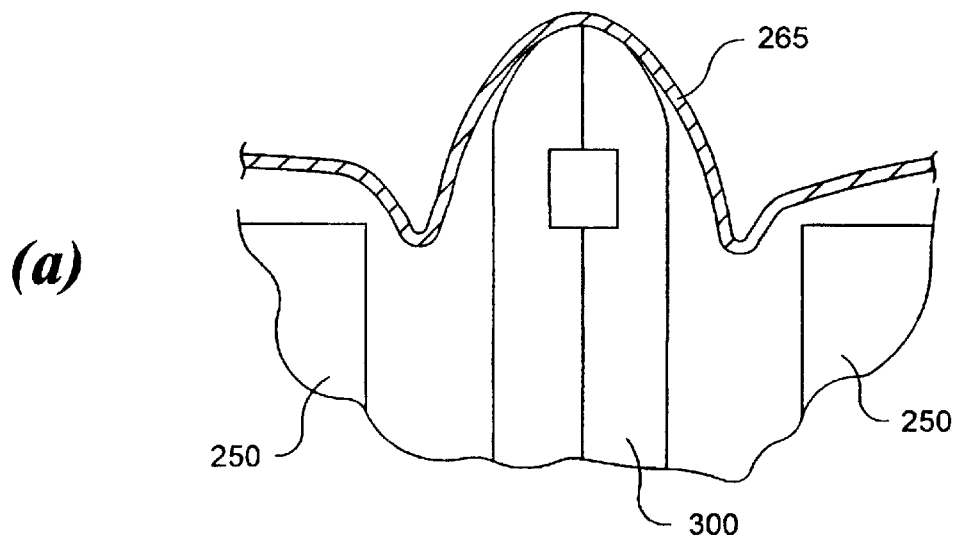
FIG. 27(a) is a view showing the deformation of a magnetic tape traveling in a conventional magnetic recording/reproduction apparatus wherein the deformation is in the sliding direction.
FIG. 27(b) is a view showing the deformation of the magnetic tape in a conventional magnetic recording/reproduction apparatus wherein the deformation is in the direction perpendicular to the sliding direction.
Figure 27:
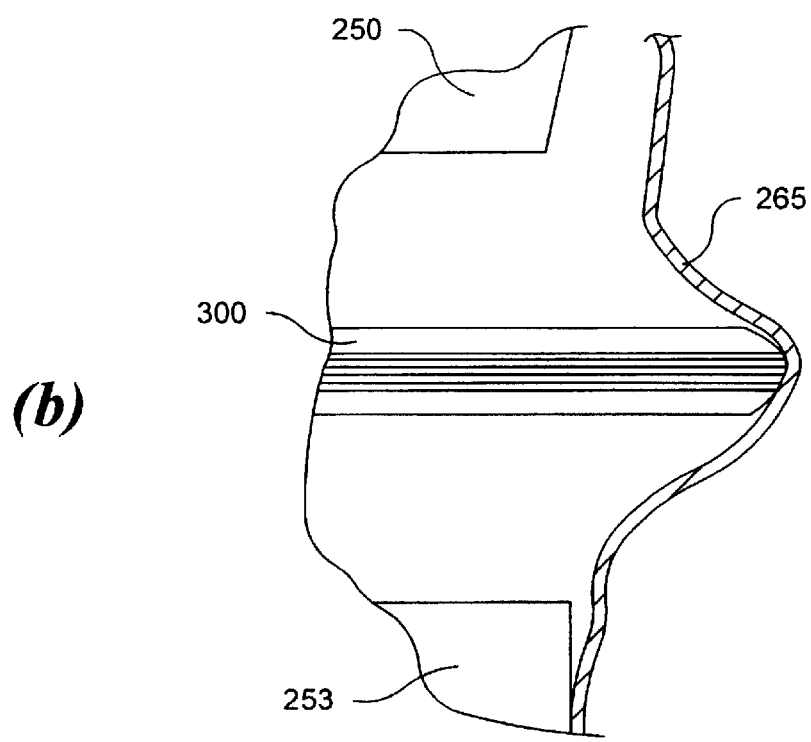

As shown in FIG. 25, the travel system of the magnetic recording/reproducing apparatus comprises: a rotation drum device 258 provided with magnetic heads 254, a supply reel 256, a take-up reel 257, rotation posts 259, 260, 261, 262, 263 and 264, slant posts 266 and 267, a pinch roller 268, a capstan 269, and a tension arm 270. A magnetic tape 265 is routed along these.

The magnetic tape 265 wound on the supply reel 256 travels by virtue of the pulling operation of the pinch roller 268 and the capstan 269, is pressed against the magnetic heads 254 mounted on the rotation drum device 258 by the guide of the slant posts 266 and 267, passes between the pinch roller 268 and the capstan 269 and is taken up on the take-up reel 257.

The rotation drum device 258 is the so-called upper rotation drum type, and on the side face of this rotation drum, the magnetic heads 254, two in number, are installed 20μm projected from the side face.

When the magnetic tape is transmitted in this magnetic recording/reproducing apparatus, the magnetic tape is attracted to the grooves of the head by the flow of air owing to the rotation of the rotation drum device. Therefore, the magnetic tape slides over the magnetic head while being attracted to the magnetic head side around the magnetic head. This state will be described with respect to the cross section (FIG. 26(a)) in the tape sliding direction and the cross section (FIG. 26(b)) in a direction perpendicular to the sliding direction.

Since the magnetic tape 265 is attracted to the side of the head 254 near the grooves 206 as shown in FIG. 26(a) and FIG. 26(b), even if the floating amount of the tape fluctuates on the inlet and outlet sides of the magnetic tape, head touch is maintained properly.

In particular, even if a magnetic tape having a thickness (total thickness) different from that of the standard is used for example and the floating shape of the magnetic tape is not constant, stable head touch can be obtained by the action of the grooves around the magnetic core.

On the other hand, in the case when a conventional lamination-type magnetic head 300 is used for an apparatus similar to that described above as shown in FIG. 27(a) and FIG. 27(b), if the floating amount of the tape fluctuates on the inlet and outlet sides of the magnetic tape 265, the effect of the fluctuation cannot be canceled, and head touch becomes unstable.

As described above, in the magnetic recording/reproducing apparatus of the present embodiment, the area of the sliding face of the magnetic head is large while keeping good head touch; and therefore, the contact pressure of the magnetic tape becomes small, and the wear amount of the sliding face of the magnetic head also becomes small.

In addition, unlike the conventional magnetic head, this thin-film magnetic head does not require a winding exter-nally; and therefore, the size of the window in the upper drum for mounting the thin-film head can be made smaller than the conventional window. By making the window smaller, it is possible to obtain the effect of preventing the magnetic tape from making contact with the rotation drum.

In the above-mentioned embodiments, although a ferrite head and an MR head have been explained as magnetic heads, the present invention has similar effect for a lamination-type magnetic head consisting of a lamination member of nonmagnetic layers and magnetic layers, as well as, for a thin-film magnetic head and a thin-film magnetic head having a magnet-resistive effect element.

Furthermore, although explanation has been made on examples of films formed of diamond-like carbon and cubic crystal boron nitride as protective films to be formed on the sliding face were described in the embodiments 2, 3 and 5 to 9, in addition to these, a thin film formed of one of SiC, CrN, diamond, carbon, TiN, TiC, $Si_3N_4$, $Al_2O_3$, TaC, ZrC, etc., or a thin film formed of a combination of two or more of these may be used to form a protective film.

The thickness of the protective film is preferably 50 nm or less in consideration of a spacing loss.

Though the hardness of the protective film should be determined by considering the combination of the film and the magnetic tape with which the film makes contact, in the case when measurement was conducted by using Nano Indenter XP of NANO Instruments, Inc., for example, the hardness should preferably be 20 GPa or more.

This instrument measures the hardness while changing indentation depth and uses a Berkovich pressure application piece made of diamond. The hardness obtained by this instrument is different from the Vickers hardness and is 1/94.59 of the Vickers hardness when converted.

As described above, with the structure of the magnetic head of the present invention, it is possible to provide a magnetic head being excellent in wear resistance and capable of obtaining good contact with a magnetic tape. Furthermore, with the structure of the magnetic recording/reproducing apparatus in accordance with the present invention in another point of view, it is possible to provide a magnetic recording/reproducing apparatus being excellent in wear resistance and capable of making good contact with a magnetic tape.

Although the present invention has been described with respect to its preferred embodiments in some detail, the disclosed contents of the preferred embodiments may change in the details of the structure, and changes in the combination and sequence of the components may be attained without departing from the scope and spirit of the claimed invention.

In the claims:

1. A magnetic head to be mounted on a rotation drum to perform magnetic recording or reproduction by making contact with and sliding over a magnetic tape having at least one track with a predetermined width, the magnetic head comprising:

a sliding face that makes contact with the magnetic tape;

two grooves partially extending in the rotation direction of said drum are formed with a predetermined distance therebetween in said sliding face of said magnetic head, said sliding face making contact with at least a portion of the magnetic tape proximate to said grooves; and a gap in said sliding face between said two grooves to create a fringing magnetic field for magnetic recording, wherein a width of the portion positioned between said two grooves in said sliding face of said magnetic head is between about the track width and about 100 μm, wherein the track width is about 100 μm or less, and a width of each of said grooves is between about 5μm and about 50 μm.

2. A magnetic head in accordance with claim 1, wherein a length of said groove formed in said sliding face is not more than a sliding length along which said head makes contact with the magnetic tape.

3. A magnetic head in accordance with claim 1 or 2, wherein a protective film is formed on said sliding face.

4. A magnetic recording/reproducing apparatus comprising a rotation drum device having a rotation drum provided with the magnetic heads in accordance with claim 1 and a stationary drum adjacent to said rotation drum, rotation posts and slant posts for guiding the magnetic tape to said rotation drum device and contacting the magnetic tape with external faces of said stationary drum and said rotation drum, and a capstan and a pinch roller for feeding the magnetic tape at a predetermined speed.

5. A magnetic head mounted on a rotation drum that rotates about a rotational axis to perform magnetic recording or reproduction by making contact with and sliding over a magnetic tape having at least one track with a predetermined width, the magnetic head comprising:

a sliding face that makes contact with the magnetic tape;

two grooves substantially extending in a direction at a right angle to the rotational axis of said drum are formed with a predetermined distance therebetween; and a gap in the sliding face of said magnetic head making contact with the magnetic tape to create a fringing magnetic field for magnetic recording, wherein positions of said grooves are disposed within an area of the sliding face in which said magnetic head makes contact with the magnetic tape.

6. A magnetic head in accordance with claim 5, wherein a protective film is formed on said sliding face.

7. A magnetic recording/reproducing apparatus comprising a rotation drum device having a rotation drum provided with magnetic heads in accordance with claim 5, a stationary drum adjacent to said rotation drum, rotation posts and slant posts for guiding the magnetic tape to said rotation drum device and contacting the magnetic tape with external faces of said stationary drum and said rotation drum, and a capstan and a pinch roller for feeding the magnetic tape at a predetermined speed.

8. A thin-film magnetic head provided with a magnet-resistive effect element to perform magnetic recording or reproduction on a magnetic recording medium, the magnetic head comprising:

a sliding face that makes contact with the magnetic tape, and a dent portion formed around said magnet-resistive effect element in the sliding face that makes contact with the magnetic recording medium.

9. A magnetic head in accordance with claim 8, wherein said dent portion around said magnet-resistive effect element is generally rectangularly-shaped and is substantially disposed on said sliding face.

10. A magnetic head in accordance with claim 8 wherein a film having a wear resistance higher than that of a material which forms said magnet-resistive effect element is formed on said sliding face.

11. A magnetic recording/reproducing apparatus comprising a rotation drum device provided with magnetic heads in accordance with claim 8 on an external face thereof and a tape guide mechanism for guiding the magnetic recording medium and contacting the magnetic recording medium with said external face.

* * * * *